US012266382B2

(12) United States Patent
Yee et al.

(10) Patent No.: US 12,266,382 B2
(45) Date of Patent: Apr. 1, 2025

(54) MODIFYING AND COLLABORATING WITH DIGITAL VIDEOS THROUGH INTERACTIONS WITH VIDEO TRANSCRIPTS

(71) Applicant: Dropbox, Inc., San Francisco, CA (US)

(72) Inventors: Derrick Yee, San Francisco, CA (US); LeeJun Park, San Jose, CA (US); Harry Twyford, Toronto (CA); Ernest Cheng, Seattle, WA (US); Isaac Leong, McLean, VA (US)

(73) Assignee: Dropbox, Inc., San Francisco, CA (US)

( * ) Notice: Subject to any disclaimer, the term of this patent is extended or adjusted under 35 U.S.C. 154(b) by 139 days.

(21) Appl. No.: 18/146,590

(22) Filed: Dec. 27, 2022

(65) Prior Publication Data

US 2024/0212715 A1 Jun. 27, 2024

(51) Int. Cl.
*G11B 27/06* (2006.01)
*G06F 3/04842* (2022.01)
*G06F 40/166* (2020.01)
*G11B 27/00* (2006.01)
*G11B 27/031* (2006.01)
*G11B 27/34* (2006.01)
*G06F 40/10* (2020.01)

(52) U.S. Cl.
CPC ........ *G11B 27/031* (2013.01); *G06F 3/04842* (2013.01); *G06F 40/166* (2020.01); *G11B 27/06* (2013.01); *G11B 27/34* (2013.01)

(58) Field of Classification Search
CPC .... G06F 40/166; G06F 3/04842; G06F 40/10; G06F 40/00; G11B 27/031; G11B 27/06; G11B 27/34; G11B 27/00
USPC .......................... 386/278, 282, 239, 248, 245
See application file for complete search history.

(56) References Cited

U.S. PATENT DOCUMENTS

| | | |
|---|---|---|
| 2007/0192107 A1 | 8/2007 | Sitomer et al. |
| 2016/0012821 A1 | 1/2016 | Goldberg |
| 2018/0189369 A1* | 7/2018 | Baek ..................... G06F 40/197 |
| 2019/0311331 A1* | 10/2019 | Steinhoff ........... G06Q 10/1053 |
| 2020/0090661 A1 | 3/2020 | Ackerman et al. |
| 2024/0135973 A1* | 4/2024 | Bai ........................ G11B 27/28 |

* cited by examiner

Primary Examiner — Daquan Zhao
(74) Attorney, Agent, or Firm — Keller Preece PLLC

(57) ABSTRACT

The present disclosure is directed toward systems, methods, and non-transitory computer-readable media for editing and collaborating with digital videos through interactions with video transcripts. For example, the disclosed systems can provide a user interface for interacting with a video transcript associated with a digital video. Based on interacting with the video transcript, the disclosed systems can perform editing operations and/or collaborating operations in relation to the digital video. For instance, the disclosed systems can edit a digital video at a video portion corresponding to transcript location where a user interaction occurs within a video transcript.

20 Claims, 14 Drawing Sheets

MODIFYING AND COLLABORATING WITH DIGITAL VIDEOS THROUGH INTERACTIONS WITH VIDEO TRANSCRIPTS

BACKGROUND

Advancements in computing devices and networking technology have given rise to a variety of innovations in local and internet-based video editing software. For example, local and web-based video editing applications can edit digital videos by adding frames, removing frames, and stitching frames together where segments have been removed. Existing video editing systems can also generate transcriptions from digital videos for text-based versions of audio channels that accompany the digital videos. Despite these advances, however, existing video editing systems continue to suffer from a number of disadvantages, particularly in terms of flexibility, efficiency, and accuracy.

As just suggested, certain existing video editing systems are inflexible. More particularly, some existing systems only provide video editing tools for directly interacting with a digital video itself. To elaborate, if a user of an existing video editing system wants to remove a portion of a digital video, the limited tools of the existing system only enable the user to remove the desired portion by interacting directly with one or more frames of the digital video. As a result of such limited editing tools, existing systems cannot flexibly adapt to different mediums by which to edit digital videos.

Due at least in part to their inflexibility, some existing video editing systems are inefficient. More specifically, certain existing systems waste computing resources such as processing power, memory, and network bandwidth by providing inefficient user interfaces that require excessive numbers of user interactions to access desired data and/or functionality. For example, the limited editing tools provided by existing systems require editors to perform excessively large numbers of video editing operations in relation to digital videos, where a more efficient system could reduce the number of inputs and operations. In some cases, existing systems require especially large editing operations to locate portions of a digital video where individual words or sentences occur, often requiring users to scrub back and forth across video frames to find a nearest approximation.

In addition to their inflexibilities and inefficiencies, some existing video editing systems are also inaccurate. In particular, existing systems inaccurately edit digital videos. For example, the editing tools of existing systems treat video content and audio content independently. Without more sophisticated tools based on relationships between video frames and audio content, these existing systems can sometimes inaccurately edit digital videos. For instance, if an editor desires to edit or remove a video segment depicting a conversation between two actors, an existing video editing system cannot accurately indicate the start or end of the conversation, instead relying on the editor to identify and select frames to edit or remove.

SUMMARY

This disclosure describes one or more embodiments of systems, methods, and non-transitory computer-readable storage media that provide benefits and/or solve one or more of the foregoing and other problems in the art. For instance, the disclosed systems provide a new system for editing and collaborating with digital videos through interactions with video transcripts. In some embodiments, the disclosed systems provide a user interface that presents a digital video together with a video transcript for the digital video. Based on receiving user interactions with the video transcript, the disclosed systems can perform editing operations, such as removing, modifying, or adding content to the digital video and/or can perform collaboration operations, such as collaborative editing, sharing, or commenting on portions of the digital video.

Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
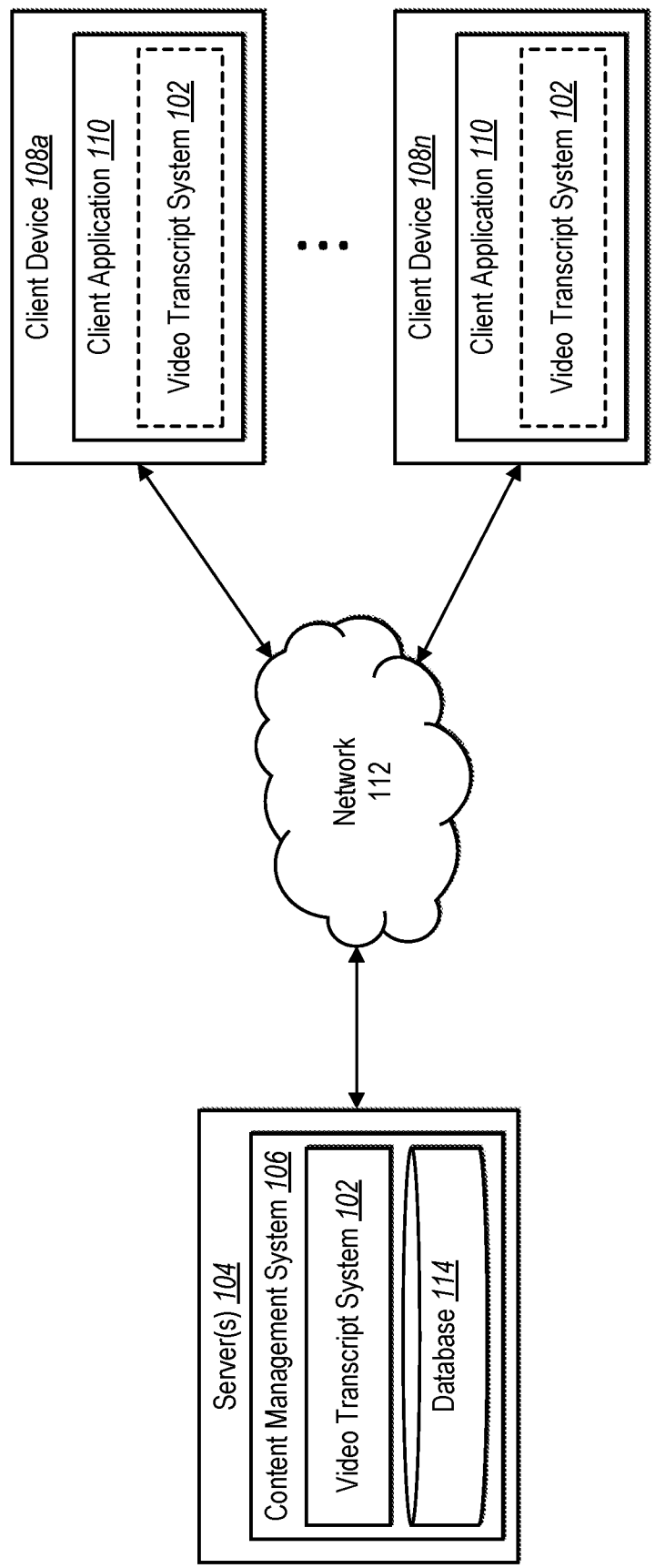
FIG. 1 illustrates a schematic diagram of an example environment of a video transcript system in accordance with one or more embodiments.

This disclosure describes one or more embodiments of a video transcript system that can facilitate editing and collaborating with a digital video through interactions with a video transcript. In particular, the video transcript system can generate or access a video transcript for a digital video and can further receive user interactions with the video transcript. The video transcript system can further determine a video portion of the digital video that corresponds to a transcript location where the user interaction occurred. Based on an editing interaction with the video transcript, the video transcript system can perform an editing operation to, for example, remove the video portion corresponding to the transcript location, modify the video portion corresponding to the transcript location, or add content to the video portion corresponding to the transcript location. Based on a collaboration interaction with the video transcript, the video transcript system can perform a collaboration operation to, for example, share the video portion corresponding to the transcript location, comment on the video portion corresponding to the transcript location, or perform collaborative editing on the video portion corresponding to the transcript location. The video transcript system can also provide user interfaces, including mobile interfaces, for editing and collaborating with digital videos through interactions with video transcripts.

As just mentioned, the video transcript system can receive a user interaction with a video transcript corresponding to a digital video. More specifically, the video transcript system can receive a user interaction to perform an editing operation or a collaboration operation. For instance, the video transcript system can receive (from a client device) an indication of a user interaction at a transcript location within the video transcript. In some cases, the video transcript system determines the transcript location where the user interaction occurs by determining a word placement of the interaction within the video transcript. In addition, the video transcript system can determine a corresponding video portion that lines up with, or corresponds to, the transcript location where the user interaction occurs. In some cases, the video transcript system can provide a visual indication at the video portion of the user interaction at the transcript location.

As mentioned, the video transcript system can receive an indication of an edit interaction. For example, the video transcript system can receive an indication to edit a digital video in the form of a deletion of text from the transcript location. As another example, the video transcript system can receive an indication to edit the digital video in the form of an addition of text to the transcript location. As yet another example, the video transcript system can receive an indication to edit the digital video in the form of a modification to text at the transcript location. Based on the edit interaction at the transcript location, the video transcript system can perform a corresponding edit to the digital video. Specifically, the video transcript system can modify the digital video at a video portion corresponding to the transcript location where the user interaction occurs by removing, adding, or modifying video content based on the user interaction.

As mentioned, the video transcript system can receive an indication of a collaboration interaction. For example, the video transcript system can receive a collaboration interaction in the form of an insertion of a comment at a transcript location within a video transcript. As another example, the video transcript system can receive a collaboration interaction in the form of a request to share a portion of text from the video transcript. As yet another example, the video transcript system can receive a collaboration interaction in the form of one or more collaborative edits from collaborating user accounts. The video transcript system can further perform a collaboration operation based on the collaboration interaction by adding a comment to a video portion corresponding to a transcript location where a comment was inserted, generating and sharing a video segment corresponding to a transcript location selected for sharing, and/or by modifying one or more video portions corresponding to transcript locations where collaborative edits occur.

As suggested above, the video transcript system can provide several improvements or advantages over existing video editing systems. For example, the video transcript system can provide improved flexibility over existing systems. While many existing systems provide limited tool sets that rigidly require direct interaction with a digital video to perform editing operations, the video transcript system can adapt to different editing mediums. Indeed, in addition to facilitating edits through interaction with a digital video, the video transcript system further enables editing a digital video through interaction with a video transcript.

Due at least in part to improving flexibility over prior video editing systems, the video transcript system can also improve efficiency. To elaborate, the video transcript system can facilitate more efficient editing of digital videos with more efficient user interfaces than prior video editing systems. Indeed, while some existing systems require editors to perform excessively large numbers of video editing operations in relation to digital videos, especially in cases of locating or modifying portions of a digital video where specific words or sentences occur, the video transcript system more efficiently edits word-specific video portions. Specifically, the video transcript system determines and modifies video portions that correspond to transcript locations where user interactions occur within a video transcript (e.g., for specific words). Thus, rather than wasting resources by processing excessively large numbers of user interactions, the video transcript system reduces the number of interactions for editing digital videos, thereby saving computing resources for processing the interactions.

In addition, the video transcript system can also improve video editing accuracy over prior video editing systems. As opposed to existing systems that treat video content and audio content independently, the video transcript system can identify video portions that directly correspond to (or align with) transcript locations where user interactions occur with specific words. Thus, the video transcript system can more accurately edit a digital video by modifying a video portion that corresponds to edited text at a transcript location. Indeed, the video transcript system can automatically identify and edit word-specific frames of a digital video.

As illustrated by the foregoing discussion, the present disclosure utilizes a variety of terms to describe features and benefits of the video transcript system. Additional detail is hereafter provided regarding the meaning of these terms as used in this disclosure. As used herein, the term "transcript location" refers to a location or a placement within a video transcript. For example, a transcript location includes one or more words (or corresponding video frames or timestamps for the one or more words) within a video transcript. A transcript location can have a start point and an end point within a video transcript and can encompass or include a section of text within the video transcript. In some embodiments, a transcript location corresponds to a particular video portion of the digital video associated with the video transcript.

As used herein, the term "video portion" refers to a section or a portion of a digital video that corresponds to a transcript location. For example, a video portion can include a start frame/time and an end frame/time that correspond to start/end points of a transcript location. Thus, a video portion can include a number of frames or a video duration that aligns with a corresponding transcript location. In some cases, a video segment can refer to a portion of a digital video that corresponds to a single word from a video transcript, where the word has a start frame/timestamp and an end frame/timestamp.

Relatedly, the term "video segment" refers to a portion of a digital video that compiled or generated as a standalone video taken from part(s) of a whole digital video. For example, the video transcript system generates a video segment from one or video portions corresponding to selected text from a video transcript. The video transcript system can further share the video segment with collaborating user accounts. Indeed, a video segment can refer to a sub-video that is playable and interact-able as its own digital video but that originates from a larger digital video and is generated based on user interaction (e.g., with the larger digital video or with a video transcript).

Additional detail regarding the video transcript system will now be provided with reference to the figures. For example, FIG. 1 illustrates a schematic diagram of an example system environment for implementing a video transcript system 102 in accordance with one or more implementations. An overview of the video transcript system 102 is described in relation to FIG. 1. Thereafter, a more detailed description of the components and processes of the video transcript system 102 is provided in relation to the subsequent figures.

As shown, the environment includes server(s) 104 and client devices 108a-108n. Each of the components of the environment can communicate via the network 112, and the network 112 may be any suitable network over which computing devices can communicate. Example networks are discussed in more detail below in relation to FIGS. 13-14.

As mentioned above, the example environment includes client devices 108a-108n. The client devices 108a-108n can be one of a variety of computing devices, including a smartphone, a tablet, a smart television, a desktop computer, a laptop computer, a virtual reality device, an augmented reality device, or another computing device as described in relation to FIGS. 13-14. The client devices 108a-108n can communicate with the server(s) 104 via the network 112. For example, the client device 108a can receive user input from respective users interacting with the client device 108a (e.g., via the client application 110) to, for instance, access, generate, modify, or share a digital video, to collaborate with a co-user of a different client device in relation to a digital video, or to select user interface elements for interacting with the content management system 106. In addition, the video transcript system 102 on the server(s) 104 can receive information relating to various interactions with content items and/or user interface elements based on the input received by the client device 108a.

As shown, the client devices 108a-108n can include a client application 110. In particular, the client application 110 may be a web application, a native application installed on the client devices 108a-108n (e.g., a mobile application, a desktop application, etc.), or a cloud-based application where all or part of the functionality is performed by the server(s) 104. Based on instructions from the client application 110, the client devices 108a-108n can present or display information, including a user interface for interacting with (or collaborating regarding) a digital video and/or a video transcript associated with the digital video. Using the client application, the client devices 108a-108n can perform (or request to perform) various operations, such as editing operations to a digital video (via interactions with a video transcript) or collaboration operations with user accounts of others of the client devices 108a-108n (e.g., to collaborate regarding a digital video).

As illustrated in FIG. 1, the example environment also includes the server(s) 104. The server(s) 104 may generate, track, store, process, receive, and transmit electronic data, such as digital videos, interactions with digital videos, and/or interactions between user accounts or client devices. For example, the server(s) 104 may receive an indication from the client device 108a of a user interaction selecting text from a transcript location of a video transcript. In addition, the server(s) 104 can transmit data to the client device 108a in the form of a visual indication of a video portion selected corresponding to the selected text at the transcript location. Indeed, the server(s) 104 can communicate with the client devices 108a-108n to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the video transcript system 102 as part of a content management system 106. The content management system 106 can communicate with the client devices 108a-108n to perform various functions associated with the client application 110 such as managing user accounts, interacting with digital videos, and/or interacting with video transcripts. Indeed, the content management system 106 can include a network-based smart cloud storage system to manage, store, and maintain content items (including digital videos and corresponding video transcripts) and related data across numerous user accounts. In some embodiments, the video transcript system 102 and/or the content management system 106 utilize the database 114 to store and access information such as digital videos, video transcripts, and other information.

Although FIG. 1 depicts the video transcript system 102 located on the server(s) 104, in some implementations, the video transcript system 102 may be implemented by (e.g., located entirely or in part on) one or more other components of the environment. For example, the video transcript system 102 may be implemented by the client devices 108a-108n and/or a third-party system. For example, the client devices 108a-108n and/or a third-party system can download all or part of the video transcript system 102 for implementation independent of, or together with, the server(s) 104.

In some implementations, though not illustrated in FIG. 1, the environment may have a different arrangement of components and/or may have a different number or set of components altogether. For example, the client devices 108a-108n may communicate directly with the video transcript system 102, bypassing the network 112. The environment may also include one or more third-party systems, each corresponding to a different set of user accounts and storing data for the user accounts, including social media posts, digital images, digital videos, or other content items. In addition, the environment can include the database 114 located external to the server(s) 104 (e.g., in communication via the network 112) or located on the server(s) 104 and/or on the client devices 108a-108n.

Figure 2:
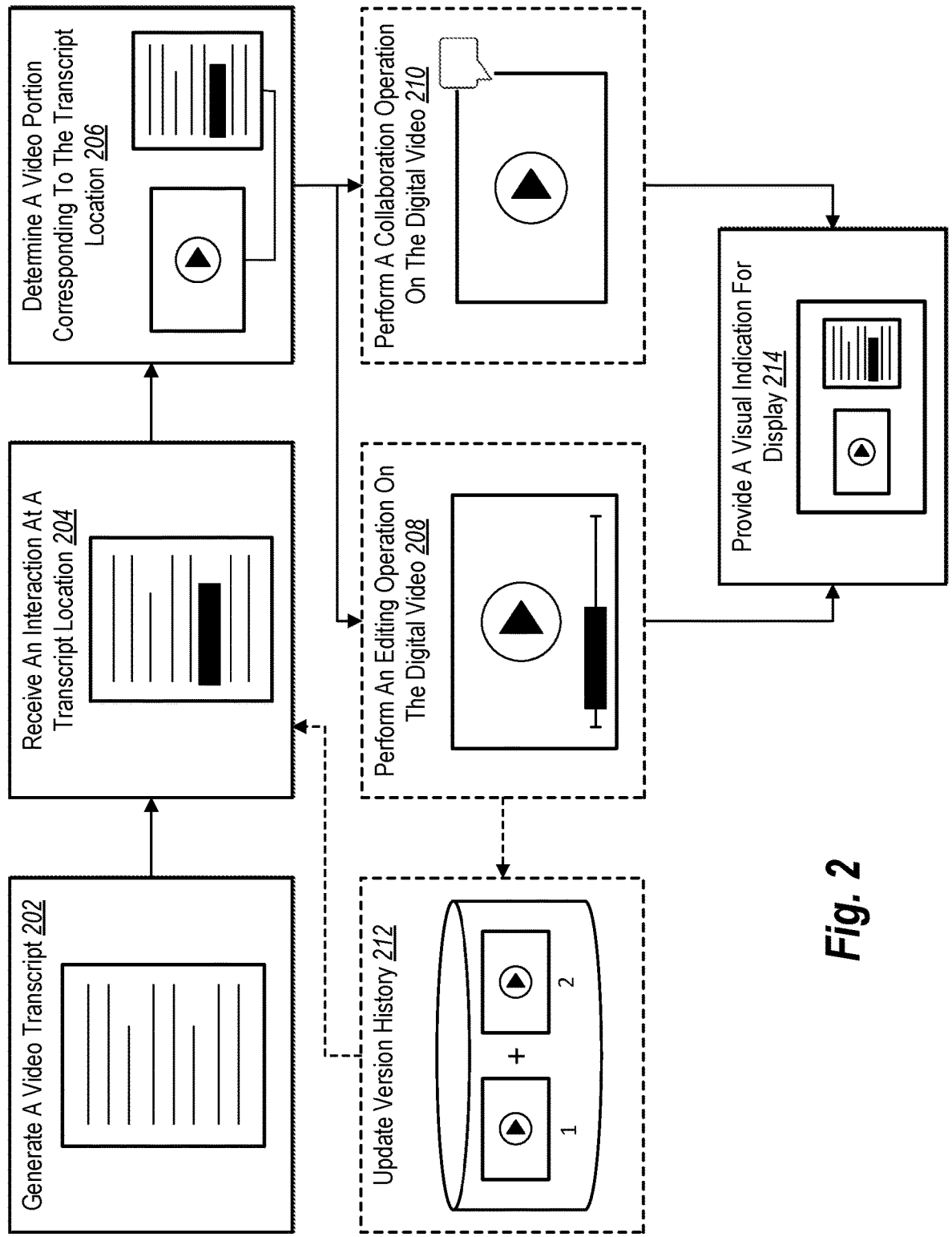
FIG. 2 illustrates an example overview of editing and collaborating with a digital video based on interactions with a video transcript in accordance with one or more embodiments.

As mentioned above, the video transcript system 102 can facilitate editing operations and/or collaboration operations regarding digital videos. In particular, the video transcript system 102 can receive user interactions in relation to a video transcript for a digital video, and the video transcript system 102 can perform an editing operation or a collaboration operation in response to the interaction. FIG. 2 illustrates an example sequence of acts for performing editing operations and/or collaboration operations based on user interactions with a video transcript in accordance with one or more embodiments. FIG. 2 provides an overview for editing and collaboration in relation to a digital video. Additional detail regarding the various acts illustrated in FIG. 2 is provided thereafter with reference to subsequent figures.

As illustrated in FIG. 2, the video transcript system 102 performs an act 202 to generate a video transcript. More specifically, the video transcript system 102 generates a video transcript by using a video transcription pipeline to transcribe one or more audio channels for the digital video. For example, the video transcript system 102 transcribes the audio channels using one or application programming interfaces (APIs) for transcription services that use audio-to-text (or speech-to-text) models, such as models offered by Amazon Web Services or other custom, proprietary models. In some cases, the video transcript system 102 otherwise obtains or accesses a video transcript that is generated by an external system.

In addition, the video transcript system 102 performs an act 204 to receive an interaction at a transcript location. To elaborate, the video transcript system 102 receives an indication from a client device (e.g., the client device 108a) of a user interaction at a particular transcript location. For example, the video transcript system 102 receives an indication of an editing interaction at a particular transcript location with a video transcript. As another example, the video transcript system 102 receives an indication of a collaboration interaction at a transcript location with the video transcript.

As further illustrated in FIG. 2, the video transcript system 102 performs an act 206 to determine a video portion corresponding to the transcript location. In particular, the video transcript system 102 determines a transcript location that indicates a text segment (e.g., a number of words or characters) within the video transcript where the user interaction occurs. The video transcript system 102 further determines a corresponding location within the digital video. For instance, the video transcript system 102 determines a video portion that includes a number of frames, or a time duration, that corresponds to or aligns with the transcript location within the video transcripts. In some cases, the video transcript system 102 determines a start frame/time of of a video portion that aligns with a beginning word/character of the transcript location and an end frame/time of the video portion that aligns with an end word/character of the transcript location.

In one or more embodiments, as shown in FIG. 2, the video transcript system 102 performs an act 208 to perform an editing operation on the digital video. Specifically, the video transcript system 102 performs an editing operation in response to receiving an editing interaction in relation to the video transcript. For example, the video transcript system 102 performs an editing operation to edit the digital video at the video portion corresponding to the transcript location where the user interaction takes place. In some cases, an editing operation includes: i) a visual indication of the selected video portions corresponding to a selected transcript location, ii) a removal of one or more frames, iii) an insertion of additional digital content at one or frames, iv) a modification to audio channels corresponding to one or more frames, v) generation and insertion of a transition between frames, vi) censoring (e.g., bleeping or cutting) one or more frames (e.g., for certain audiences or to remove personally identifiable information), vii) generating a video segment of one or frames, viii) translating audio from one language to another for one or more frames, and/or ix) detecting and removing blank spaces or "um"s for one or more frames. The video transcript system 102 can perform an editing operation in response to a respective editing interaction, where each type of editing operation can correspond to its own type of editing interaction in relation to a video transcript.

In some embodiments, the video transcript system 102 performs an act 210 to perform a collaboration operation on the digital video. More particularly, the video transcript system 102 performs a collaboration operation in response to receiving a collaboration interaction in relation to the video transcript. For example, the video transcript system 102 performs a collaboration operation, such as: i) sharing a video segment from one collaborating user account to another, ii) generating a comment from one user account for viewing/responding by collaborating user accounts, and/or iii) collaborative editing where multiple collaborating user accounts performs editing interactions in relation to a video transcript together, and the video transcript system 102 reconciles the collective interactions to generate a modified digital video from the collaboration.

As further illustrated in FIG. 2, the video transcript system 102 performs an act 212 to update a version history. To elaborate, based on performing an editing operation (e.g., via the act 208), the video transcript system 102 performs the act 212 to update a version history associated with a digital video. For example, the video transcript system 102 maintains a version history for the digital video by saving versions of the digital video corresponding to different edits or changes to the digital video. In some cases, the video transcript system 102 maintains a version history by determining and saving a delta, or a difference, between a prior version of the digital video and a current version that results from the most recent edit(s) (e.g., rather than storing the entire digital video for each version). In certain embodiments, the video transcript system 102 detects a threshold number of modifications as a trigger for updating the version history by saving a new version. In some cases, the threshold number of edits is set at a single edit (or some other number), while in other cases the threshold number of edits is modifiable. The video transcript system 102 further enables navigation through the version history to recover previous versions, where each version of the digital video is stored as a separate entity.

As further illustrated in FIG. 2, the video transcript system 102 performs an act 214 to provide a visual indication for display. More specifically, the video transcript system 102 provides a visual indication of an editing operation or a collaboration operation. For example, the video transcript system 102 provides a visual indication of an editing operation by visually portraying or depicting a modification to a digital video that the video transcript system 102 carries out in response to an editing interaction with a video transcript. As another example, the video transcript system 102 provides a visual indication of a collaboration operation by visually portraying or depicting a comment or a shared video segment that the video transcript system 102 generates in response to a collaboration interaction with a video transcript.

Figure 3:
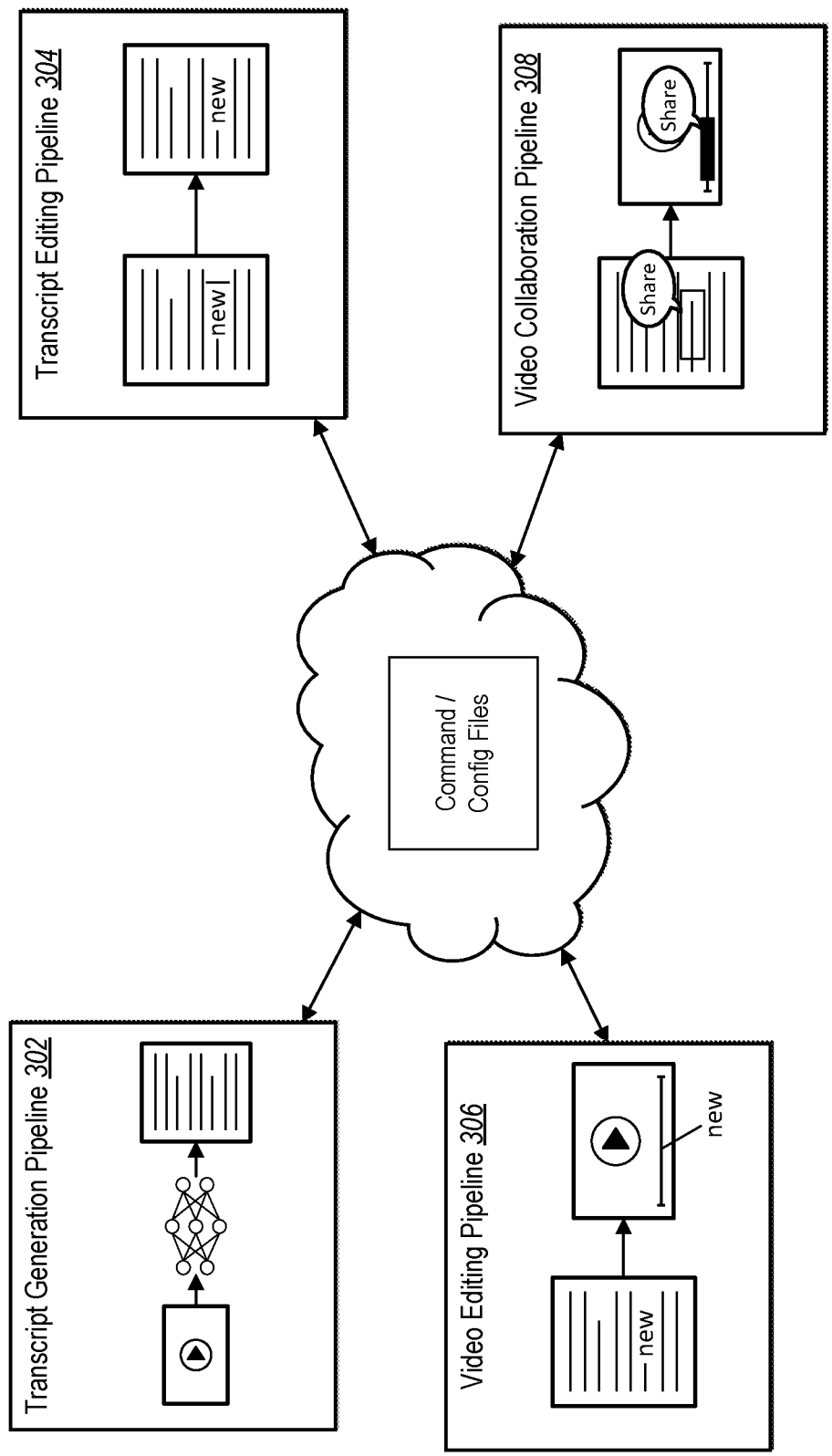
FIG. 3 illustrates an example diagram for different pipelines for editing transcripts, editing digital videos, and collaborating in accordance with one or more embodiments.

As mentioned above, in certain embodiments, the video transcript system 102 utilizes a distributed architecture to manage, edit, and collaborate with digital videos based on user interactions with video transcripts. In particular, the video transcript system 102 utilizes a distributed architecture that includes various network platforms or processing components housed at one or more servers in communication via a network (e.g., the network 112). FIG. 3 illustrates an example diagram of a distributed architecture for the video transcript system 102, including its various pipelines for performing different functions, in accordance with one or more embodiments.

As illustrated in FIG. 3, the video transcript system 102 utilizes a transcript generation pipeline 302. More specifically, the video transcript system 102 utilizes a set of network components, processors, or servers to generate a video transcript. For example, the video transcript system 102 utilizes a set of network components dedicated to transcribing digital videos. In some cases, the transcript generation pipeline 302 includes (or uses APIs to access) one or more speech-to-text models for generating video transcripts from digital videos. For instance, the video transcript system 102 utilizes a speech-to-text model, such as Google Speech to Text or an Amazon Web Services speech-to-text model. Using such a model, the video transcript system 102 generates a video transcript from a digital video (or from an audio channel of a digital video).

As also illustrated in FIG. 3, the video transcript system 102 utilizes a transcript editing pipeline 304. In particular, the transcript editing pipeline includes a set of network components, processors, or servers dedicated to editing video transcripts. Indeed, the video transcript system 102 utilizes the transcript editing pipeline 304 to edit or modify a video transcript generated via the transcript generation pipeline 302. For instance, the video transcript system 102 generates a command/config file using the transcript generation pipeline 302, where the command/config file defines the video transcript generated from a digital video. The video transcript system 102 further passes the command/config file from the transcript generation pipeline 302 to the transcript editing pipeline 304. In addition, the video transcript system 102 utilizes the transcript editing pipeline 304 to process user interactions received from a client device to edit or otherwise interact with the video transcript. In some cases, the video transcript system 102 utilizes the transcript editing pipeline 304 to generate a command/config file that defines one or more user interactions with a video transcript (e.g., for editing or collaboration), including an indication of a transcript location where the user interaction(s) take place.

Additionally, the video transcript system 102 utilizes a video editing pipeline 306. The video editing pipeline 306 can include a set of network components, processors, or servers dedicated to editing or modifying a digital video based on user interactions in relation to a video transcript. For instance, the video transcript system 102 passes a command/config file from the transcript editing pipeline 304 to the video editing pipeline 306, whereupon the video editing pipeline 306 processes or analyzes the command/config file. The video editing pipeline 306 thus processes the command/config file to determine a video portion corresponding to the transcript location where edits occurred. The video editing pipeline 306 further processes the command/config file to determine an edit to make to the video portion and to generate a modified digital video by performing the edit.

As further illustrated in FIG. 3, the video transcript system 102 utilizes a video collaboration pipeline. To elaborate, the video collaboration pipeline 308 can include a set of network components, processors, or servers dedicated to collaborating in relation to a digital video based on user interactions in relation to a video transcript. For instance, the video transcript system 102 passes a command/config file from the transcript editing pipeline 304 to the video collaboration pipeline 308, whereupon the video collaboration pipeline 308 processes or analyzes the command/config file. The video collaboration pipeline 308 thus processes the command/config file to determine a video portion corresponding to the transcript location where collaboration interactions occurred. The video collaboration pipeline 308 further processes the command/config file to determine a collaboration operation to perform and further performs the collaboration operation in relation to the digital video.

Figure 4:
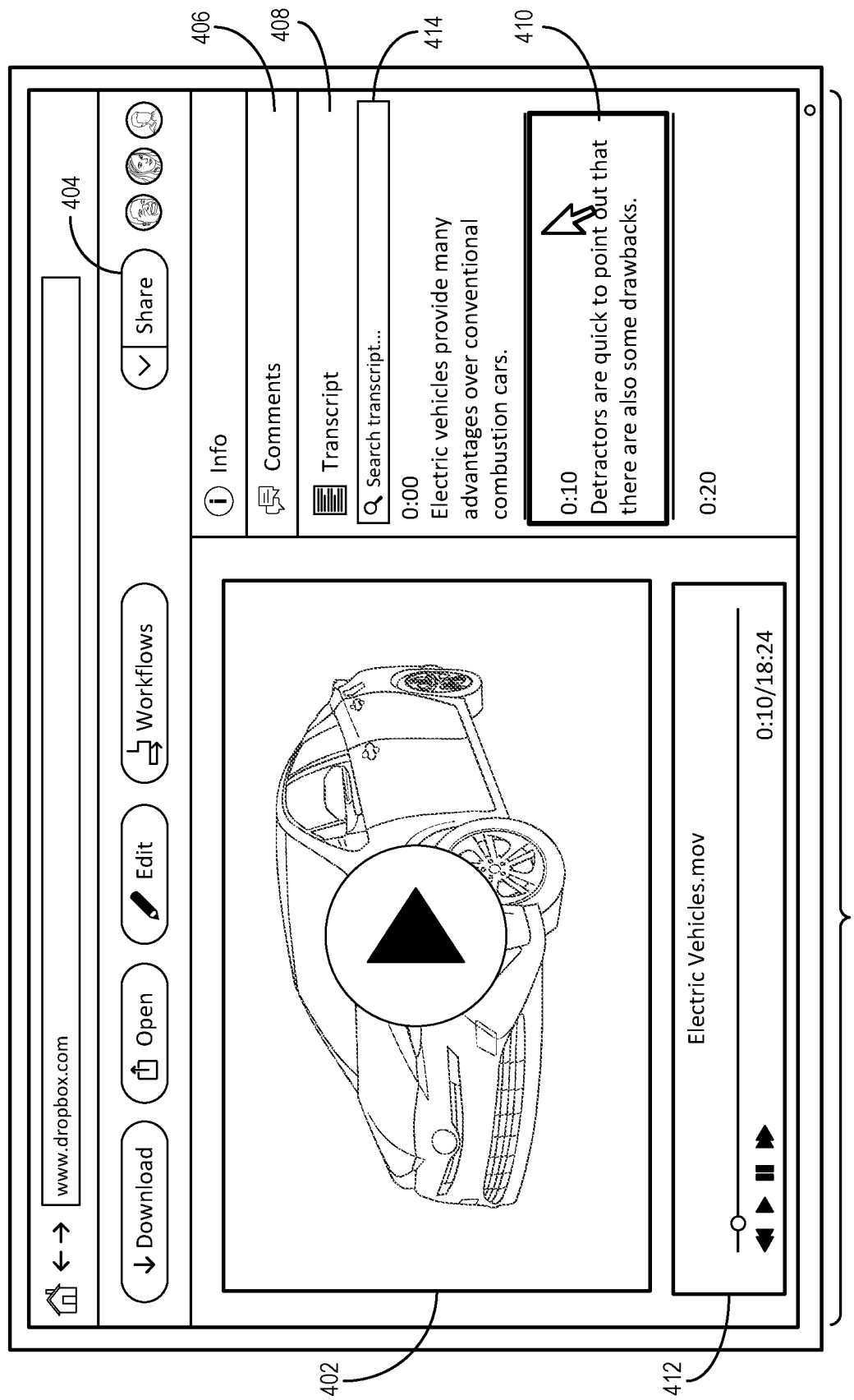
FIG. 4 illustrates an example video transcript interface for interacting with a digital video and a video transcript in accordance with one or more embodiments.

As mentioned above, in certain described embodiments, the video transcript system 102 provides a user interface for interacting with a digital video and/or a video transcript. In particular, the video transcript system 102 generates and provides a video transcript interface that includes a visual representation of a digital video together with a visual representation of the corresponding video transcript. FIG. 4 illustrates an example video transcript interface in accordance with one or more embodiments.

As illustrated in FIG. 4, the video transcript interface 400 includes a digital video 402 together with a video transcript 408. As shown, the video transcript system 102 divides the video transcript 408 into sections, each having a certain length in words or time duration (e.g., ten seconds). The video transcript system 102 can receive a user interaction selecting a section 410 within the video transcript 408, whereupon the video transcript system 102 can navigate to and present the corresponding video portion within the digital video 402 and can indicate the time within the video control panel 412. Indeed, the video transcript system 102 can determine a transcript location in the form of the selected section 410 and can further determine the corresponding video portion for presentation. As shown, the video transcript system 102 receives a user interaction selecting the section 410 at 0:10, and the video transcript system 102 determines the corresponding video portion to present within the digital video 402 and the video control panel 412.

In some cases, the video transcript system 102 enables more granular navigation as well. Specifically, the video transcript system 102 enables word-by-word navigation, where the video transcript system 102 can receive a selection of an individual word within the video transcript 408 (e.g., as a single-word transcript location). In response, the video transcript system 102 can determine and present a corresponding video portion for display within the digital video 402 and within the video control panel 412. Indeed, the video transcript system 102 can determine a start frame/timestamp and an end frame/timestamp for each word of the video transcript 408. Accordingly, the video transcript system 102 can also determine corresponding video portions for an individual word based on the start and end of the word.

The video transcript interface 400 also includes additional interface elements that are selectable to perform various functions. For example, the video transcript interface includes a share element 404 selectable to share all or part of the digital video 402. Specifically, in response to a user interaction selecting the share element 404, the video transcript system 102 can determine one or more transcript locations of selected text from the video transcript 408 (e.g., within one or more highlighted sections or a selection of certain contiguous or non-contiguous words). The video transcript system 102 can further generate a video segment from video portions corresponding to the transcript location(s) of the selected text for sharing with one or more collaborating user accounts.

As shown, the video transcript interface 400 also includes a video control panel 412. In particular, the video transcript system 102 can receive user interactions with the video control panel 412 to scrub through frames of the digital video 402, to play the digital video 402, to pause the digital video 402, and/or to perform other video playback functions. As mentioned, the video control panel 412 also indicates a current time of a video portion presented in the digital video 402 and the corresponding transcript location within the video transcript 408.

In addition, the video transcript interface 400 includes a search element 414. Indeed, based on receiving a search query within the search element 414, the video transcript system 102 can search through the video transcript to identify words or phrases corresponding to the search query. In some cases, based on identifying a word or phrase corresponding to a search query, the video transcript system 102 determines a transcript location for the word or phrase and further determines a corresponding video portion within the digital video 402. The video transcript system 102 can further present the video portion corresponding to the search query for display within the video transcript interface 400 and can indicate the video portion within the video control panel 412.

Further, the video transcript interface 400 includes a comments pane 406. In particular, based on a user interaction selecting the comments pane 406, the video transcript system 102 can expand the comments pane for providing collaborative tools for commenting on different video portions of the digital video 402 and/or transcript locations within the video transcript 408. For example, the video transcript system 102 can receive an interaction to create a comment associated with the section 410 (or a selection of a number of words), and the video transcript system 102 can generate a corresponding comment icon for display within the digital video 402, along with a marker indicating a comment at a timestamp for the corresponding video portion within the video control panel 412.

Figure 5:
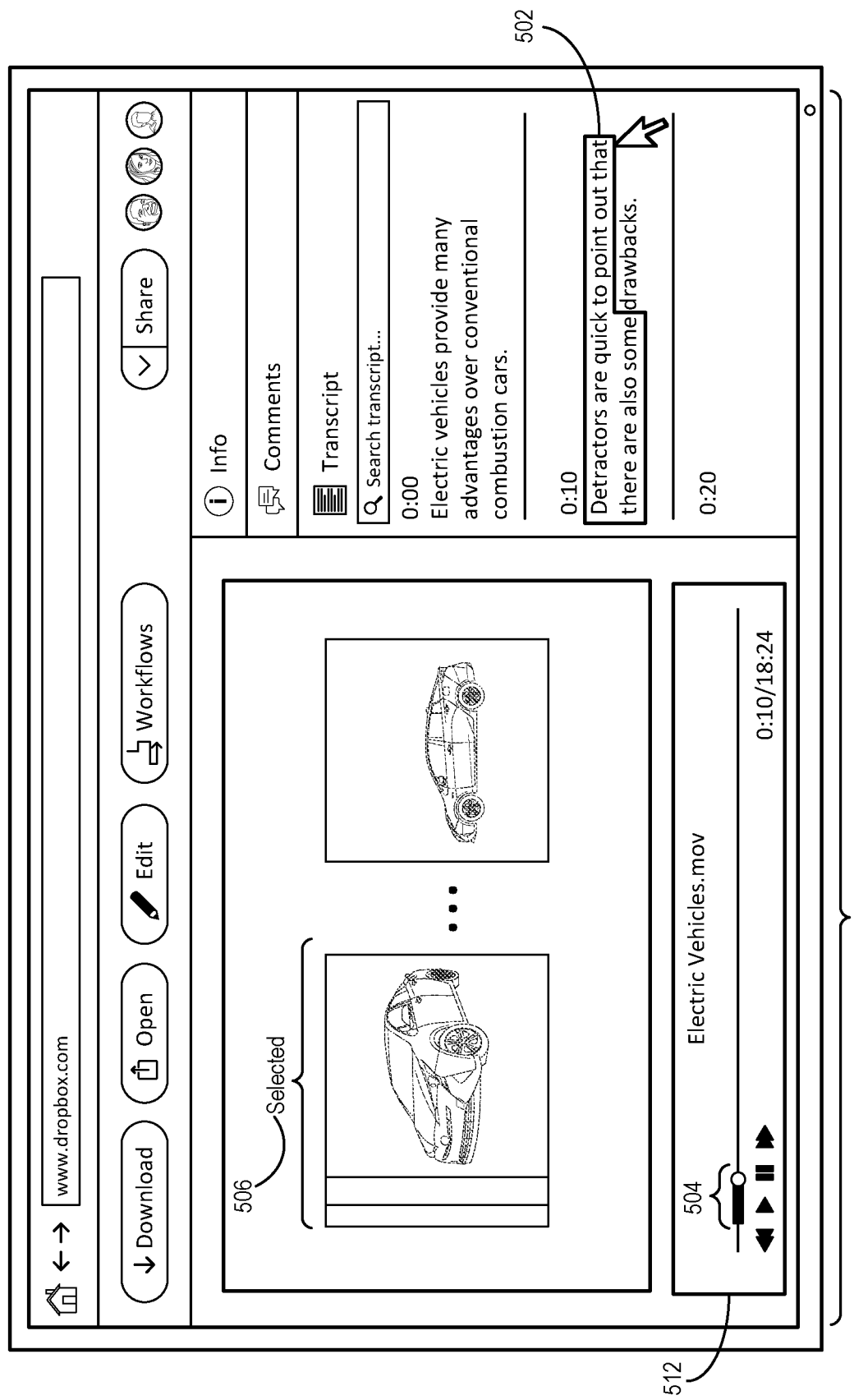
FIG. 5 illustrates an example video transcript interface for selecting a transcript location and a corresponding video portion in accordance with one or more embodiments.

As mentioned above, in certain described embodiments, the video transcript system 102 selects portions of a digital video based on user interactions within a video transcript. In particular, the video transcript system 102 determines a video portion corresponding to a transcript location where a user interaction occurs, and the video transcript system 102 further provides a visual indication of the user interaction in relation to the digital video. FIG. 5 illustrates an example video transcript interface for selecting portions of a digital video based on interactions with a video transcript in accordance with one or more embodiments.

As illustrated in FIG. 5, the video transcript interface 500 includes an indication of selected text 502. Indeed, the video transcript system 102 receives an indication of a user interaction selecting or highlighting the selected text 502. Based on the user interaction of the selected text 502, the video transcript system 102 further determines a transcript location for the selected text 502 and a corresponding video portion within the digital video.

As shown, the video transcript system 102 highlights, or indicates a selection of, the video portion directly within the digital video and/or within the video control panel 512. Within the video control panel 512, the video transcript system 102 provides a selection element 504 indicating a number of a frames or a time duration of the digital video that are selected based on the selected text 502. Within the video presentation panel, the video transcript system 102 generates a selection element 506 to indicate one or frames (or a time duration) for the video portion selected corresponding to the selected text 502. Although FIG. 5 illustrates a series of selected frames in the video presentation panel, in some embodiments, the video transcript system 102 presents the digital video to fill the video frame (as in FIG. 4) in a standard playable view for a video player. Within this view, the video transcript system 102 can overlay or otherwise present a selection element (e.g., the selection element 506 or a highlighted color) to indicate whether a currently presented frame is selected (or corresponds to the selected text 502).

Figure 6:
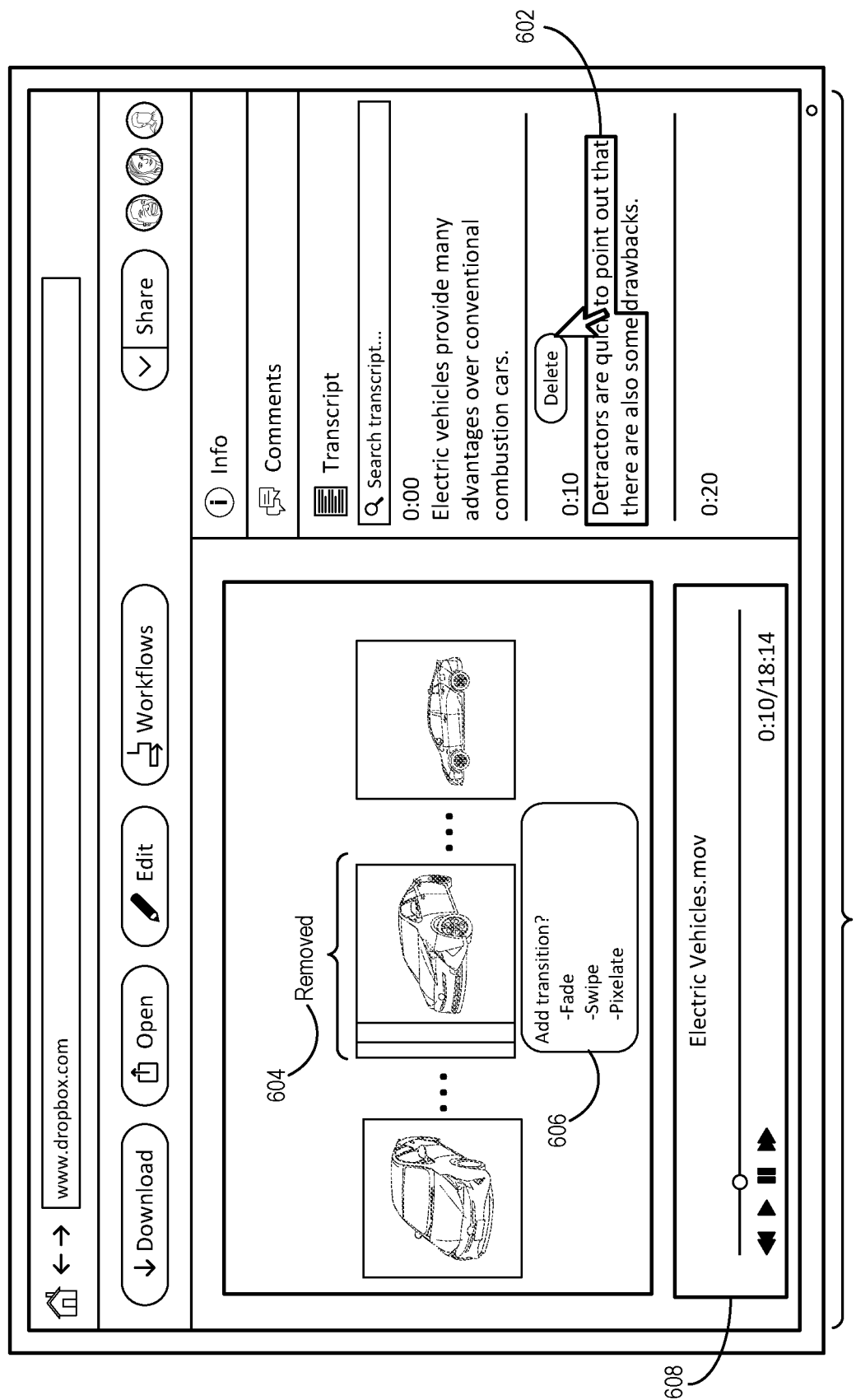
FIG. 6 illustrates an example video transcript interface for deleting a video portion based on deleting text from a transcript location of a video transcript in accordance with one or more embodiments.

As mentioned above, in certain embodiments, the video transcript system 102 performs an editing operation on a digital video based on an editing interaction with a video transcript. In particular, the video transcript system 102 edits a digital video at a video portion corresponding to a transcript location where an editing operation takes place. FIG. 6 illustrates an example video transcript interface for editing a digital video by removing a video portion in accordance with one or more embodiments.

As illustrated in FIG. 6, the video transcript interface 600 receives an indication of a user interaction for selected text 602. In response, the video transcript system 102 determines a transcript location for the selected text 602, including a start frame/timestamp for the beginning of the first word ("Detractors") and an end frame/timestamp for the end of the last word ("some"). The video transcript system 102 further determines a video portion that corresponds to the transcript location of the selected text 602. As shown, the video transcript system 102 also receives an indication of a user interaction to delete the selected text 602 from the video transcript.

Based on the user interaction to delete the selected text 602, the video transcript system 102 further performs an edit operation to delete the corresponding video portion from the digital video. To elaborate, the video transcript system 102 deletes a number of frames or a time duration of the digital video that corresponds to, or aligns with, the transcript location of the selected text 602. As shown, the video transcript system 102 further provides a deletion indicator 604 that indicates a number of frames deleted from the digital video in response to the user interaction with the video transcript. In addition, the video transcript system 102 further modifies the video control panel 608 to indicate a shorter overall time ("18:14" as opposed to "18:24" in previous figures) that results from the deletion of the frames corresponding to the selected text 602.

As further illustrated in FIG. 6, the video transcript system 102 can generate a transition to stitch frames together based on removing one or more frames from the digital video. In particular, based on detecting removal of one or more frames in response to a user interaction with a video transcript, the video transcript system 102 can generate and provide a stitch element 606. Within the stitch element 606, the video transcript system 102 can provide selectable options for adding a transition to replace the removed frames to smooth out the transition from a frame prior to the removed section to a frame after the removed section. In some cases, the video transcript system 102 stores a number of preset transitions for stitching frames, including a fade transition, a swipe transition, or a pixelate transition, or a different type of transition. Based on a user selection of a transition from the stitch element 606, the video transcript system 102 adds the corresponding transition to the digital video in place of the removed frames.

In some embodiments, the video transcript system 102 can modify the video transcript based on user interactions in relation to the digital video. For example, the video transcript system 102 can receive a user interaction (within the video control panel 608 or directly with a digital video) selecting one or more frames of the digital video. The video transcript system 102 can further determine a transcript location corresponding to the selected video portion. Additionally, the video transcript system 102 can provide a visual indication within the video transcript of text within the transcript location that corresponds to the selected video portion. In some cases, based on receiving a user interaction to delete the selected video portion, the video transcript system 102 can further delete or remove the corresponding text from the transcript location of the video transcript.

Figure 7:
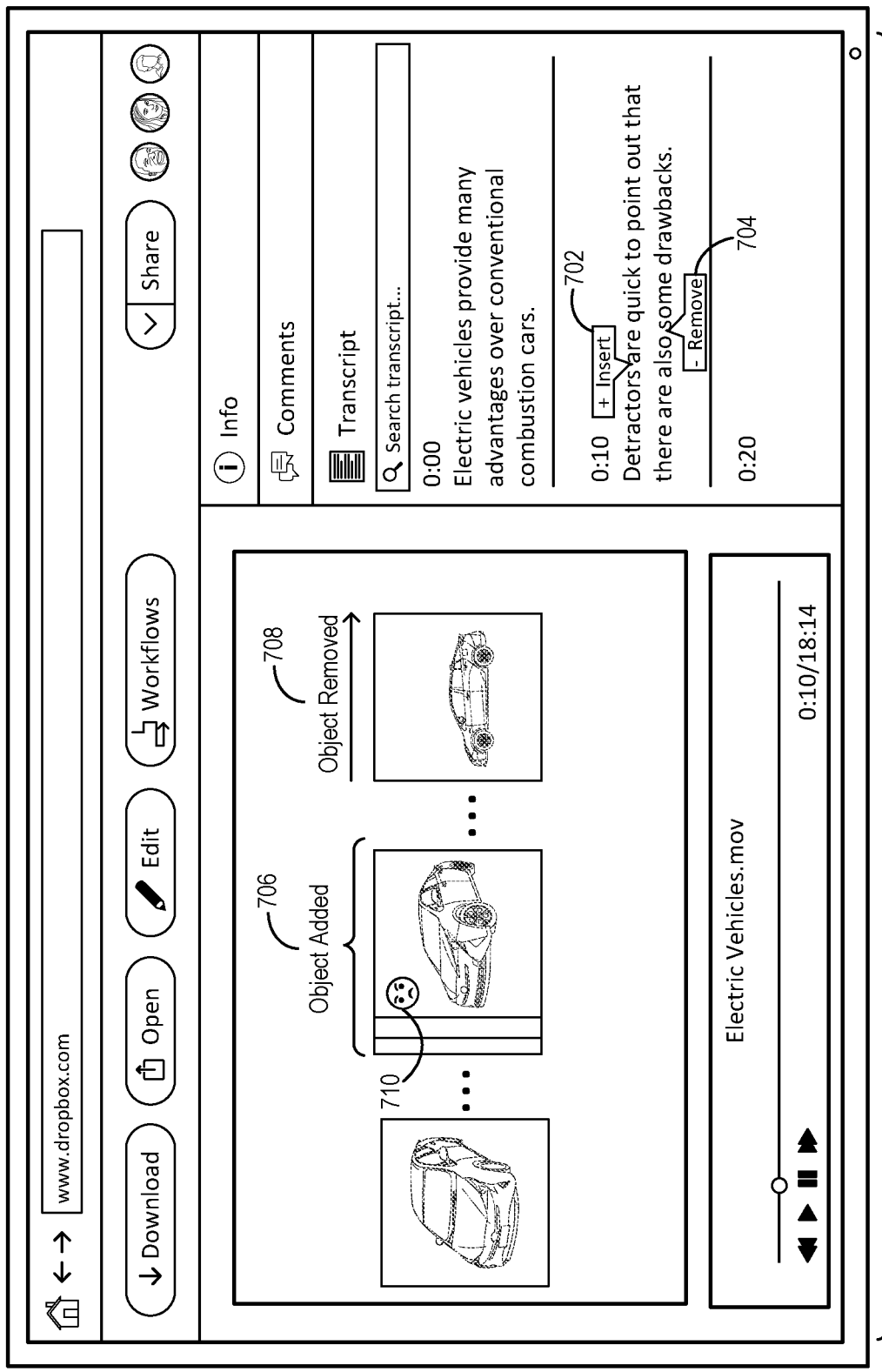
FIG. 7 illustrates an example video transcript interface for inserting video elements into a digital video in accordance with one or more embodiments.

As mentioned above, in certain described embodiments, the video transcript system 102 generates digital content to add to a digital video based on a user interaction within a video transcript. In particular, the video transcript system 102 can add a transition to stitch frames together and/or can add an object overlay or an additional (or modified) audio channel to the digital video based on user interactions with a video transcript. FIG. 7 illustrates an example video transcript interface for adding digital content to a digital video based on user interactions with a video transcript in accordance with one or more embodiments.

As illustrated in FIG. 7, the video transcript interface 700 includes a video transcript and a digital video. As shown within the video transcript interface 700, the video transcript system 102 receives user interactions within the video transcript to add special characters. Indeed, the video transcript system 102 can receive a user interaction to insert a trigger character 702 that triggers or initiates an edit operation to the digital video. For example, the video transcript system 102 analyzes the video transcript to identify a "+" (or some other trigger character) to insert a digital object within the digital video. Based on detecting the insert trigger character 702 at a transcript location, the video transcript system 102 determines a video portion corresponding to the transcript location and inserts an indicated digital object 710 within the digital video.

As shown, the video transcript system 102 inserts the digital object 710 within a video portion of the digital video based on detecting the insert trigger character 702. In addition, the video transcript system 102 generates and provides a modification indicator 706 to indicate or mark the modified video portion (e.g., a set of modified frames) within the digital video. In some cases, the video transcript system 102 can also (or alternatively) provide a modification indicator within the video control panel to indicate a modified video portion.

In some cases, based on detecting the insert trigger character 702, the video transcript system 102 further analyzes the following characters to determine a particular object to insert (e.g., a video element). For example, the video transcript system 102 can determine an object to insert within the digital video based a text analysis of one or more words following the insert trigger character 702 (e.g., "+ smiley face" to insert a smiley face). In certain embodiments, the video transcript system 102 provides a list or an object selection interface for selecting an object to insert at the video portion based on detecting the insert trigger character 702.

As further illustrated in FIG. 7, the video transcript system 102 also detects a remove trigger character 704 (e.g., "−"). Based on detecting the remove trigger character 704, the video transcript system 102 determines a transcript location and a corresponding video portion for the remove trigger character 704. The video transcript system 102 can further remove previously added digital content based on the remove trigger character 704. For example, the video transcript system 102 can identify the previous insert trigger character 702 as corresponding to the remove trigger character 704, and the video transcript system 102 can thus remove the digital object 710 inserted via the insert trigger character 702.

In some cases, the video transcript system 102 can analyze one or more words after the remove trigger character 704 to determine which digital object to remove (e.g., "− smiley face"). In other cases, based on detecting the remove trigger character 704, the video transcript system 102 can provide a list of inserted digital objects for selecting which of the digital objects to remove from the digital video. As shown, the video transcript system 102 can further generate and provide a removal indicator 708 for display within the digital video (and/or the video control panel) to indicate the removal of the digital object.

In some embodiments, the video transcript system 102 performs various other edits in response to detecting trigger characters at transcript locations. For example, the video transcript system 102 can use trigger characters to divide a digital video into video segments. To elaborate, based on detecting a trigger character or a trigger word, such as "cut," the video transcript system 102 can generate a video segment that includes frames up to the trigger character/word. Based on detecting multiple such trigger characters/words, the video transcript system 102 can generate a number of video segments divided into pieces defined by the frames that occur between the video portions corresponding to the transcript locations where the trigger characters/words occur in the video transcript.

As another type of digital content to add to a digital video, the video transcript system 102 can generate and insert new or modified audio to a digital video based on detecting a trigger character/word. For example, the video transcript system 102 can detect a trigger character to insert or replace an audio channel with a new or modified version of the audio channel. Particularly, the video transcript system 102 can replace a portion of the audio with a recording of different audio (or an upload of an audio file). For instance, based on detecting an audio replacement trigger character, the video transcript system 102 can provide an option to record a user (or to upload an audio file) to replace the audio for the corresponding video portion. In some cases, the video transcript system 102 provides an indication of a time duration for the replacement audio clip (e.g., based on a first trigger character and a second trigger character indicating a beginning transcript location and an end transcript location for the replacement audio).

The video transcript system 102 can further perform other functions based on trigger characters/words as well, such as: i) censoring or bleeping content (e.g., for certain audiences or to remove personally identifiable information), ii) adjusting volume, and/or iii) translating from one language to another. For example, based on detecting a censor trigger character, the video transcript system 102 can analyze the video transcript to identify words to remove or bleep, such as personally identifiable information and/or coarse language. In some cases, the video transcript system 102 determines a particular video portion to censor based on a first trigger character indicating a start transcript location for censoring and a second trigger character indicating an end transcript location. Likewise, the video transcript system 102 can similarly adjust volume and/or translate between languages for video portions based on trigger characters.

As another example, based on detecting a translation trigger character (or a selection of a translation option), the video transcript system 102 can translate a video portion from one language to another. More specifically, the video transcript system 102 can determine a transcript location designated for translation (e.g., between a first trigger character and a second trigger character or highlighted when a translation option is selected), and the video transcript system 102 can further determine a corresponding video portion of a digital video. In some cases, the video transcript system 102 further receives an indication of a target language for translating the video portion. Based on the source language and/or the target language, the video transcript system 102 determines a playback speed for the translated audio. Indeed, due to word gain and other timing issues between different languages, the video transcript system 102 can ensure that the translated version of the audio fits within the same number of frames or the same time duration as the original audio by modifying the playback speed of the translated audio.

In one or more embodiments, the video transcript system 102 performs additional editing operations based on user interactions with a video transcript. For example, the video transcript system 102 can receive a user interaction to modify script or font within the video transcript by, for instance, bolding font at a transcript location, underlining font at a transcript location, italicizing font at a transcript location, increasing or decreasing font size at a transcript location, and/or changing font to all caps at a transcript location. Based on detecting a user interaction to bold text at a transcript location, the video transcript system 102 can increase the volume of the digital video for the corresponding video portion. Based on decreasing a font size, the video transcript system 102 can decrease a volume. Based on other font changes, the video transcript system 102 can perform other audio modifications, such as increasing or decreasing a frequency (e.g., based on italicizing), increasing a bass channel (e.g., based on all caps), and/or increasing a treble channel (e.g., based on underlining).

As another editing operation, the video transcript system 102 can detect and remove blank spaces and/or filler words, such as "um"s or other such words. In particular, based on detecting a trigger character (or a different user input from a menu or a selectable option to remove blank space), the video transcript system 102 can analyze a video transcript to identify pauses (e.g., portions of the video transcript with no speaking for greater than a threshold time duration or number of frames). In addition, the video transcript system 102 can remove the blank spaces (and "um"s and other filler words) from the video transcript and from the digital video. For instance, the video transcript system 102 can determine video portions that correspond to transcript locations where the blank spaces occur, and the video transcript system 102 can delete or remove the respective video portions.

As mentioned above, in one or more embodiments, the video transcript system 102 saves and maintains a version history associated with a digital video. For example, the video transcript system 102 determines edits or modifications made to a digital video and saves new versions of the modified digital video based on an update trigger, such as a threshold number of modifications, a threshold amount of modified data (e.g., a number of edited frames or a number of edited megabytes), or a threshold time elapsing. Based on detecting an update trigger, the video transcript system 102 stores a new version within a version history (e.g., within the database 114). In some cases, the video transcript system 102 saves computer storage by storing versions of a digital video in the form of edit instructions, such as a set of edits performed to a video transcription that correspond to edits performed on the digital video.

Indeed, in some embodiments, based on performing an editing operation on a digital video, the video transcript system 102 determines and saves (e.g., within a version history) a set of instructions representing the editing operation. For example, the video transcript system 102 saves a set of alterations made to a video transcript, along with transcript locations (and corresponding video portions) where the alterations took place. Because the video transcript system 102 can edit a digital video based on modifications to its video transcript, the video transcript system 102 can also save video edits in the form of transcript modifications, thereby reducing storage requirements and consuming less computer memory than conventional video editing systems that store multiple versions of memory-consumptive digital videos (or portions of digital videos) for updates.

Figure 8:
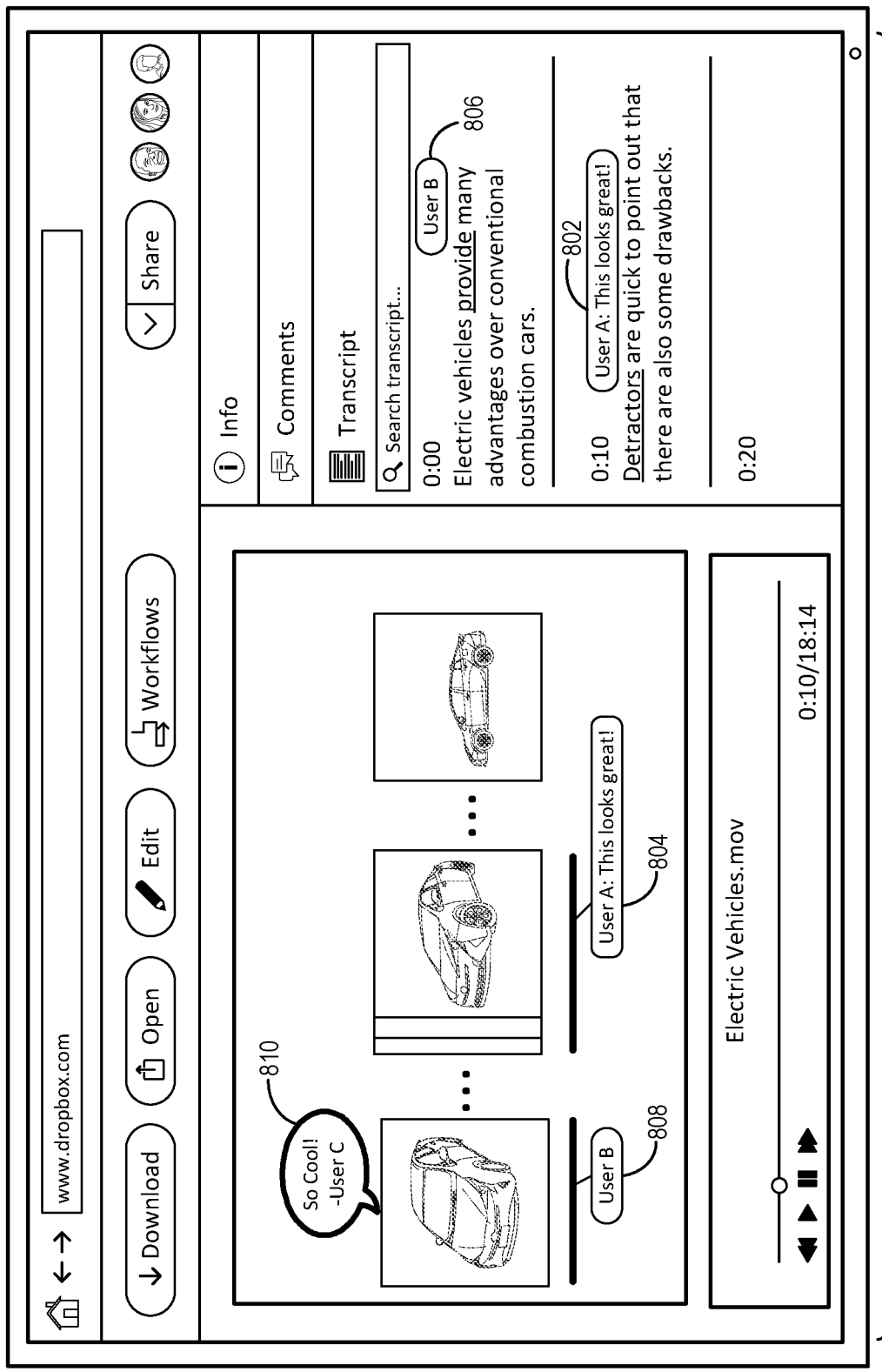
FIG. 8 illustrates an example video transcript interface for collaborating between user accounts in accordance with one or more embodiments.

As mentioned above, in certain described embodiments, the video transcript system 102 performs a collaboration operation in relation to a digital video. In particular, based on receiving an indication of a collaboration interaction relative to a video transcript, the video transcript system 102 can perform a corresponding collaboration operation relative to a digital video. FIG. 8 illustrates an example video transcript interface for performing a comment operation in accordance with one or more embodiments.

As illustrated in FIG. 8, the video transcript interface 800 includes indicators of multiple user accounts collaborating together while interacting with a digital video and/or a video transcript. As part of the collaboration, the video transcript system 102 can determine interactions (with a digital video and/or with a video transcript) associated with multiple collaborating user accounts. Based on the different interactions, the video transcript system 102 can generate and provide visual indicators of the account-specific interactions for display on client devices (e.g., the client devices 108a-108n) associated with different collaborating user accounts.

For example, the video transcript system 120 can receive an indication that User A is navigating a video transcript at a particular transcript location. In response, the video transcript system 102 can generate a first visual indicator of User A's location within the video transcript and a second visual indicator at the corresponding video portion within the digital video. As another example, the video transcript system 102 can determine that User C is commenting on a particular frame (or video portion) within the digital video. Similarly, the video transcript system 102 can generate a first visual indicator of User C's comment at the video portion where User C made the comment, along with a second visual indicator at the corresponding transcript location within the video transcript.

As illustrated in FIG. 8, the video transcript system 102 provides a comment indicator 802 that indicates a comment from User A left in relation to the word "Detractors" within the video transcript. Based on a transcript location where the comment is placed, the video transcript system 102 determines a corresponding video portion within the digital video and places the comment indicator 804 at the video portion. Indeed, the video transcript system 102 generates and provides the comment indicator 804 at the video portion within the digital video to match the comment indicator 802 created within the video transcript.

As also illustrated in FIG. 8, the video transcript system 102 determines a transcript location where User B is navigating within the video transcript. Specifically, the video transcript system 102 determines that User B has selected (or is currently reading) the word "provide" within the video transcript, and the video transcript system 102 thus provides a navigation indicator 806 for User B at the corresponding transcript location. The video transcript system 102 further determines a video portion of the digital video that corresponds to the transcript location and provides a navigation indicator 808 at the video portion within the digital video. Thus, the video transcript system 102 can indicate a location within the digital video that corresponds to the interaction location of User B within the video transcript.

Additionally, the video transcript system 102 generates and provides a comment indicator 810 for display. Specifically, the video transcript system 102 receives a comment from User C in relation a video portion within the digital video. The video transcript system 102 thus generates the comment indicator 810 to present to client devices associated with the collaborating user accounts. In some cases, the video transcript system 102 further generates a comment indicator to present at a transcript location that corresponds to the video portion of the comment indicator 810. In one or more embodiments, the video transcript system 102 generates and provides navigation indicators and/or comment indicators at different timestamps within the video control panel (e.g., corresponding to transcript locations and/or video portions where users are navigating or commenting).

In certain embodiments, the video transcript system 102 performs collaborative editing operations on a digital video. For example, the video transcript system 102 receives an indication of user interaction from User A to edit at a first transcript location and further receives an indication of user interaction from User B to edit at a second transcript location. The video transcript system 102 can further generate a modified digital video by editing the digital video at video portions corresponding to the transcript locations where User A and User B edited the video transcript. For instance, the video transcript system 102 performs an editing operation for each modification to the video transcript for each of the collaborating user accounts.

In some cases, the video transcript system 102 can intelligently synchronize changes to the digital video based on edits from multiple collaborating users. In particular, to prevent conflicting changes to a digital video as edits are performed by multiple collaborating user accounts, the video transcript system 102 determines or designates a controlling user account for initiating synchronization of video edits. To elaborate, the video transcript system 102 can receive editing interactions from multiple user accounts and can track each of the edits without propagating visual changes to other user accounts until the controlling user account selects an option to save or synchronize digital video edits. Upon such a selection, the video transcript system 102 implements the edits and provides a modified digital video and a modified video transcript to each of the collaborating user accounts. In some cases, as each of the collaborating user accounts performs respective edits, the video transcript system 102 can provide visual indicators of where each user account is modifying the digital video and the video transcript, but the video transcript system 102 may only synchronize the actual modifications upon prompting by the controlling user account.

Figure 9:
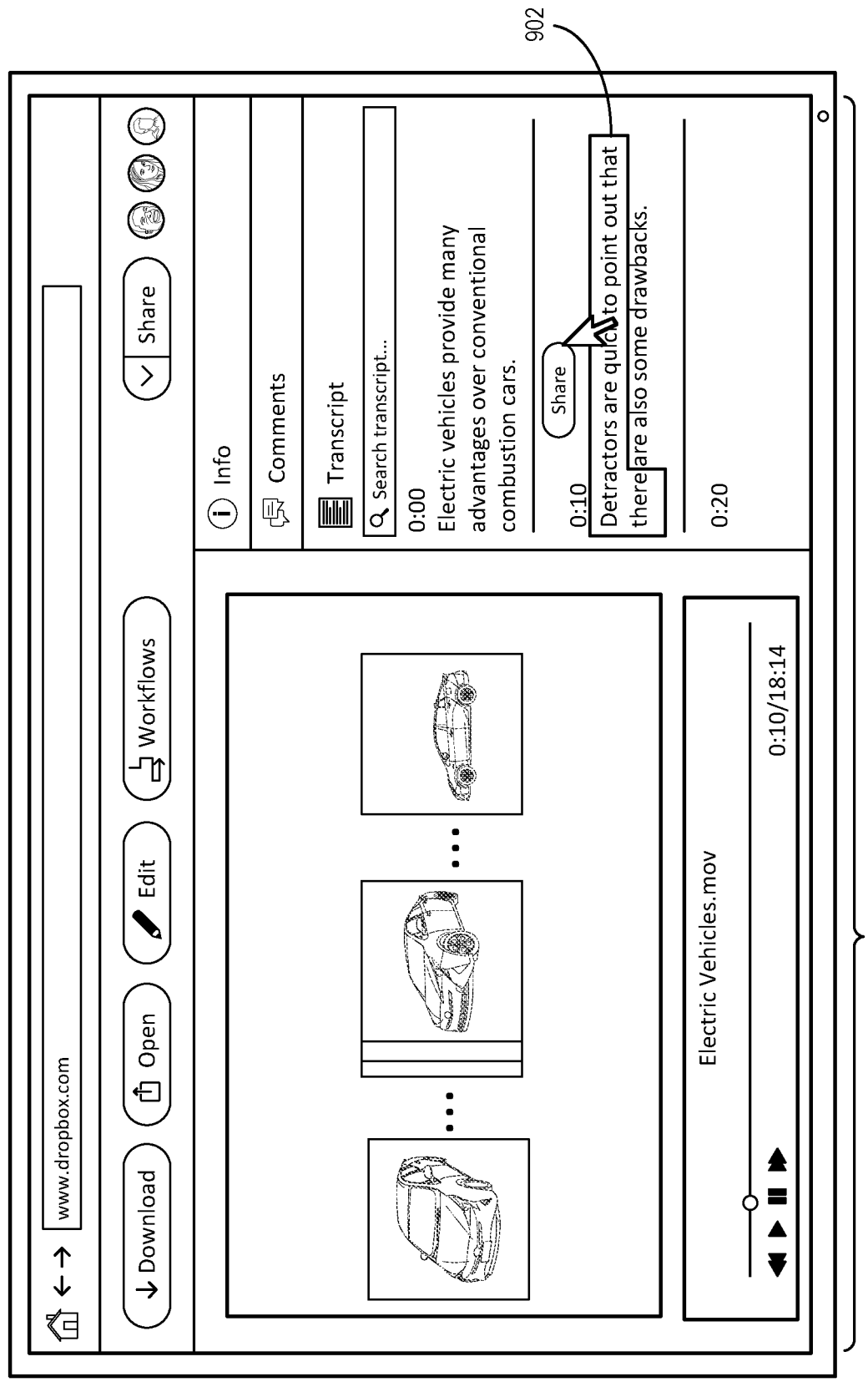
FIG. 9 illustrates an example video transcript interface for sharing video portions based on sharing selected text from a video transcript in accordance with one or more embodiments.

As mentioned above, in certain embodiments, the video transcript system 102 generates and shares a video segment based on a collaboration interaction to share a portion of a video transcript. In particular, the video transcript system 102 can receive a share interaction in relation to a portion of text at a transcript location within a video transcript, and the video transcript system 102 can generate a corresponding video segment to distribute to another user account. FIG. 9 illustrates an example video transcript interface for sharing a video segment in accordance with one or more embodiments.

As illustrated in FIG. 9, the video transcript interface 900 presents the digital video together with the corresponding video transcript. As shown, the video transcript system 102 receives a collaboration interaction to share a portion of text from the video transcript. Indeed, the video transcript system 102 receives an indication of selected text 902 at a transcript location within the video transcript. In addition, the video transcript system 102 receives a user interaction to share the selected text 902 (or to share a corresponding video portion).

In response to the user interaction to share the selected text 902, the video transcript system 102 determines a video portion of the digital video that corresponds to the transcript location of the selected text 902. In addition, the video transcript system 102 generates a video segment from the video portion. Specifically, the video transcript system 102 generates a video segment that includes frames starting at the beginning of the selected text 902 and ending at the end of the selected text 902. Based on receiving an indication of one or more user accounts with which to share the video segment, the video transcript system 102 further provides the video segment to the indicated user account(s).

Figure 10:
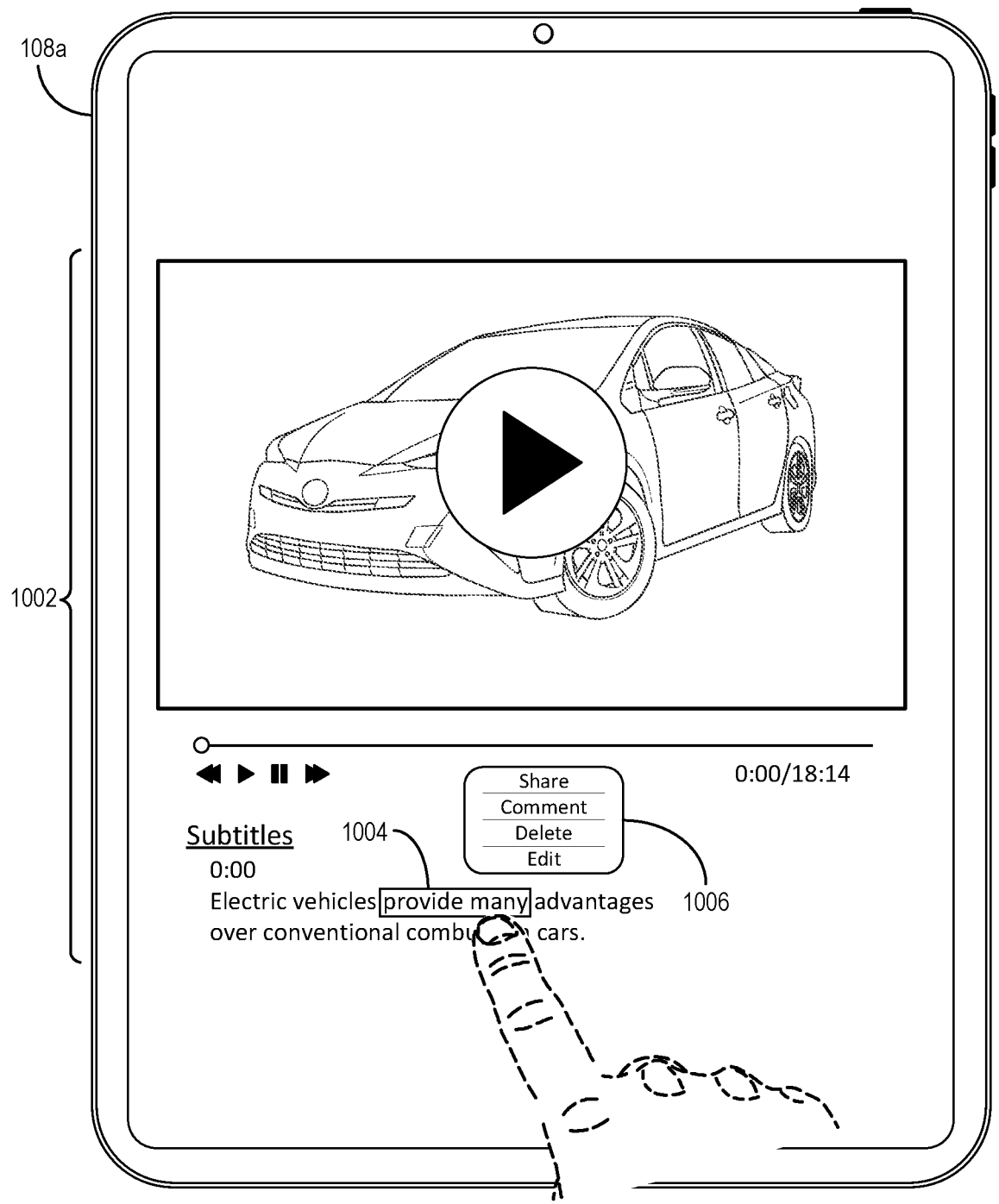
FIG. 10 illustrates an example mobile video subtitle interface for editing or collaborating with a digital video in accordance with one or more embodiments.

As mentioned above, in certain described embodiments, the video transcript system 102 can perform editing operations and/or collaboration operations in relation to a digital video based on user interactions with subtitles on a mobile device. In particular, due to the limited screen space on mobile devices, the video transcript system 102 can facilitate interactions with subtitles overlaid (or otherwise presented) on a digital video, rather than with a video transcript presented adjacent to a digital video. FIG. 10 illustrates an example mobile video subtitle interface for performing editing operations and/or collaboration operations in accordance with one or more embodiments.

As illustrated in FIG. 10, the client device 108a is a mobile device (e.g., a smartphone or a tablet) that presents or displays a mobile video subtitle interface 1002 that includes a digital video together with video subtitles. In some embodiments, the video transcript system 102 can perform any of the aforementioned editing operations and/or collaboration operations based on interactions with subtitles in the mobile setting. For example, the video transcript system 102 can receive user interaction selecting a portion of text from the subtitles, and the video transcript system 102 can determine a subtitle location associated with the selected text. Specifically, similar to determining a transcript location, the video transcript system 102 can determine a subtitle location by determining a start frame/timestamp for a first selected word within the subtitles and an end frame/timestamp for a last selected word within the subtitles. Based on the subtitle location, the video transcript system 102 can further determine a video portion corresponding to the subtitle location and can perform an editing operation and/or a collaboration operation in relation to the video portion.

As illustrated in FIG. 10, the video transcript system 102 receives an indication of selected text 1004 within the subtitles of the mobile video subtitle interface 1002. In response to receiving the indication of the selected text 1004, the video transcript system 102 can generate and provide an operation element 1006 for display within the mobile video subtitle interface 1002. Within the operation element, the video transcript system 102 can provide selectable options for sharing, commenting, deleting, editing, and/or performing other operations in relation to the selected text 1004. In some cases, the video transcript system 102 can provide different tools for performing editing operations and/or collaboration operations, such as an editing tool panel and/or a collaboration tool panel for display within the mobile video subtitle interface 1002.

Based on a selection of a particular option, the video transcript system 102 can perform the corresponding operation on the selected text 1004 as well as on a video portion corresponding to the subtitle location of the selected text 1004. For instance, the video transcript system 102 can receive a selection to share the selected text 1004, whereupon the video transcript system 102 generates a video segment from the corresponding video portion and shares the video segment with one or more indicated user accounts. As another example, based on receiving a selection to delete the selected text 1004, the video transcript system 102 deletes the selected text 1004 as well as the corresponding video portion from the digital video. Likewise, the video transcript system 102 can perform other editing operations and collaboration operations as described herein.

Figure 11:
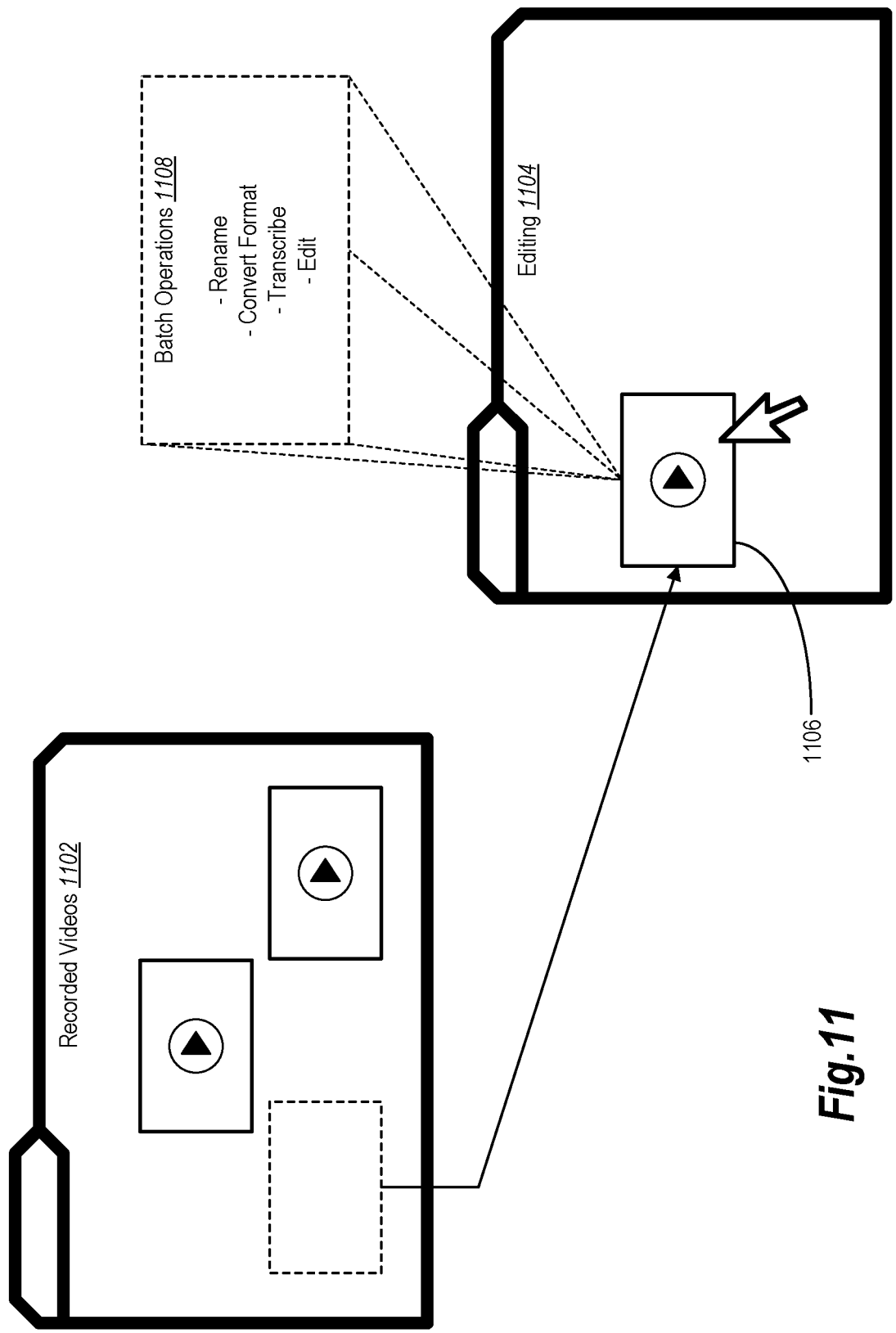
FIG. 11 illustrates an example diagram for performing batch operations on a digital video based on placement in a storage location in accordance with one or more embodiments.

In one or more embodiments, the video transcript system 102 can perform batch operations based on placement of a digital video within a particular storage location. In particular, the video transcript system 102 can automatically (e.g., without user interactions for prompting each operation) perform a set of batch operations on a digital video based on detecting that the digital video is placed in a video editing location within the content management system 106. FIG. 11 illustrates an example diagram for performing batch operations on a digital video based on placement in a video editing location in accordance with one or more embodiments.

In some embodiments, the video transcript system 102 can determine that a particular storage location (e.g., a folder or a directory) within the content management system 106 is designated as a video editing location. Based on such a determination, the video transcript system 102 can perform a number of editing operations on a digital video based on placement of the digital video into the video editing location. For instance, the video transcript system 102 can receive an indication to move a digital video from a first location to the video editing location, whereupon the video transcript system 102 automatically performs one or more editing operations on the digital video. Similarly, the video transcript system 102 can perform a number of collaboration operations (e.g., to share the digital video with a defined set of user accounts) based on determining that a digital video is placed in a collaboration location within the content management system 106.

As illustrated in FIG. 11, the video transcript system 102 receives an indication of user interaction to move a digital video 1106 from a first location within the content management system 106 (e.g., the Recorded Videos folder 1102) to a second location within the content management system 106 (e.g., the Editing folder 1104). Based on detecting placement of the digital video 1106 into the Editing folder 1104, the video transcript system 102 can perform a set of batch operations 1108. Specifically, the video transcript system 102 can rename, convert to a different file format, transcribe, and edit the digital video 1106 all based on placement of the digital video 1106 within the Editing folder 1104.

In some embodiments, the video transcript system 102 can edit the digital video 1106 by performing one or more editing operations (as defined by a user account for the Editing folder 1104), such as translating the digital video 1106, censoring the digital video 1106, and/or removing blank space from the digital video 1106. In some cases, the video transcript system 102 can alter or modify the set of batch operations 1108 based on user input to define the batch operations for the Editing folder 1104. Indeed, the set of batch operations 1108 can include editing operations and/or collaboration operations as described herein.

The components of the video transcript system 102 can include software, hardware, or both. For example, the components of the video transcript system 102 can include one or more instructions stored on a computer-readable storage medium and executable by processors of one or more computing devices. When executed by one or more processors, the computer-executable instructions of the video transcript system 102 can cause a computing device to perform the methods described herein. Alternatively, the components of the video transcript system 102 can comprise hardware, such as a special purpose processing device to perform a certain function or group of functions. Additionally or alternatively, the components of the video transcript system 102 can include a combination of computer-executable instructions and hardware.

Furthermore, the components of the video transcript system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the video transcript system 102 may be implemented as part of a stand-alone application on a personal computing device or a mobile device.

FIGS. 1-11, the corresponding text, and the examples provide a number of different systems and methods for editing and collaborating with digital videos based on interactions with video transcripts. In addition to the foregoing, implementations can also be described in terms of flowcharts comprising acts steps in a method for accomplishing a particular result. For example, FIG. 12 illustrates an example series of acts for editing and collaborating with digital videos based on interactions with video transcripts.

Figure 12:
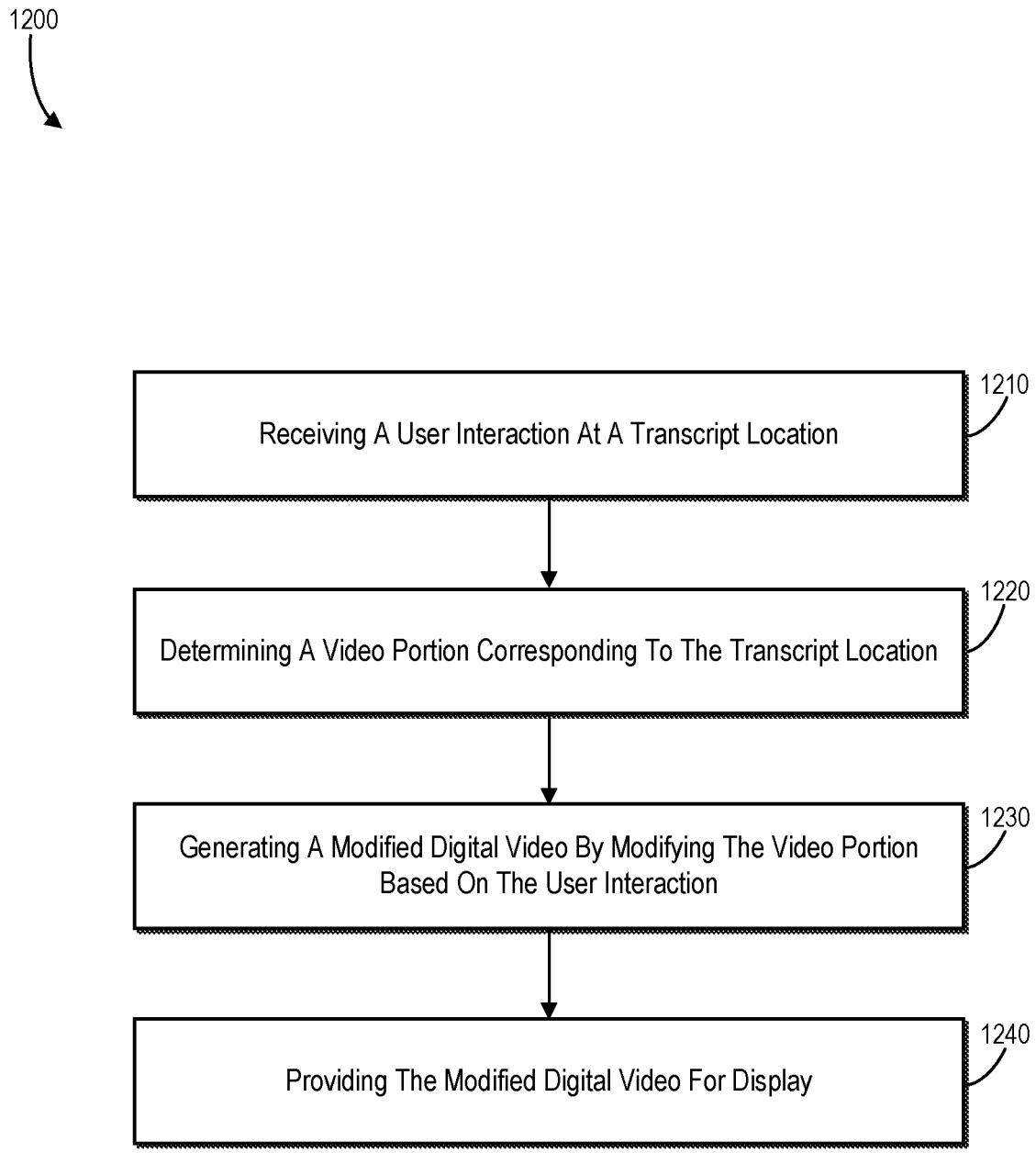
FIG. 12 illustrates a flowchart of a series of acts for editing and collaborating with a digital video based on user interactions with a video transcript in accordance with one or more embodiments.

While FIG. 12 illustrates acts according to certain implementations, alternative implementations may omit, add to, reorder, and/or modify any of the acts shown in FIG. 12. The acts of FIG. 12 can be performed as part of a method. Alternatively, a non-transitory computer-readable medium can comprise instructions, that when executed by one or more processors, cause a computing device to perform the acts of FIG. 12. In still further implementations, a system can perform the acts of FIG. 12.

As illustrated in FIG. 12, the series of acts 1200 may include acts 1210-1240. For example, the series of acts 1200 can include an act 1210 of receiving a user interaction at a transcript location. Specifically, the act 1210 can involve receiving, from a client device, an indication of a user interaction corresponding to a first transcript location within a video transcript associated with a digital video. In addition, the series of acts 1200 can include an act 1220 of determining a video portion corresponding to the transcript location. Specifically, the act 1220 can involve determining a first video portion of the digital video corresponding to the first transcript location within the video transcript. The series of acts 1200 can also include an act 1230 of generating a modified digital video by modifying the video portion based on the user interaction. The act 1230 can involve, based on the user interaction, generating a modified digital video by modifying the first video portion of the digital video corresponding to the first transcript location within the video transcript. Additionally, the series of acts 1200 includes an act 1240 of providing the modified digital video for display. The act 1240 can involve providing a visual indication of the modified digital video for display on the client device.

In some embodiments, the series of acts 1200 includes an act of receiving, from the client device, an indication of a selection of text from the video transcript and an act of, based on the selection of text, providing a visual indication of a selected video portion corresponding to the text selected within the video transcript. The series of acts 1200 can include an act of maintaining a version history for the digital video by storing versions of the digital video corresponding to modifications made in response to user interactions with the video transcript.

The series of acts 1200 can also include an act of receiving the indication of the user interaction by receiving an indication of deleting text from the first transcript location within the video transcript. In some cases, the series of acts 1200 includes an act of generating the modified digital video by: removing the first video portion of the digital video based on the indication of deleting text from the first transcript location; and, based on removing the first video portion, generating a transition to stitch together a previous portion of the digital video before the first video portion and a subsequent portion of the digital video after the first video portion.

The series of acts 1200 can include an act of receiving, from the client device, an indication of an additional user interaction adding text to a second transcript location within the video transcript associated with the digital video. In addition, the series of acts 1200 can include an act of determining a second video portion corresponding to the second transcript location within the video transcript. Further, the series of acts 1200 can include an act of generating a video element to add to the second video portion based on the additional user interaction adding text to the second transcript location.

In some embodiments, the series of acts 1200 can include an act of receiving, from the client device, an additional user interaction to comment on a portion of the video transcript associated with the digital video. The series of acts 1200 can also include an act of, based on the additional user interaction to comment on the portion of the video transcript, generating a comment for display within the digital video on the client device. Additionally, the series of acts 1200 can include an act of receiving, from the client device, an indication of an additional user interaction to share a portion of the video transcript associated with the digital video. Further, the series of acts 1200 can include an act of, based on the additional user interaction to share the portion of the video transcript: generating a video segment comprising a portion of the digital video corresponding to the portion of the video transcript indicated to share; and sharing the video segment with a user account associated with an additional client device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
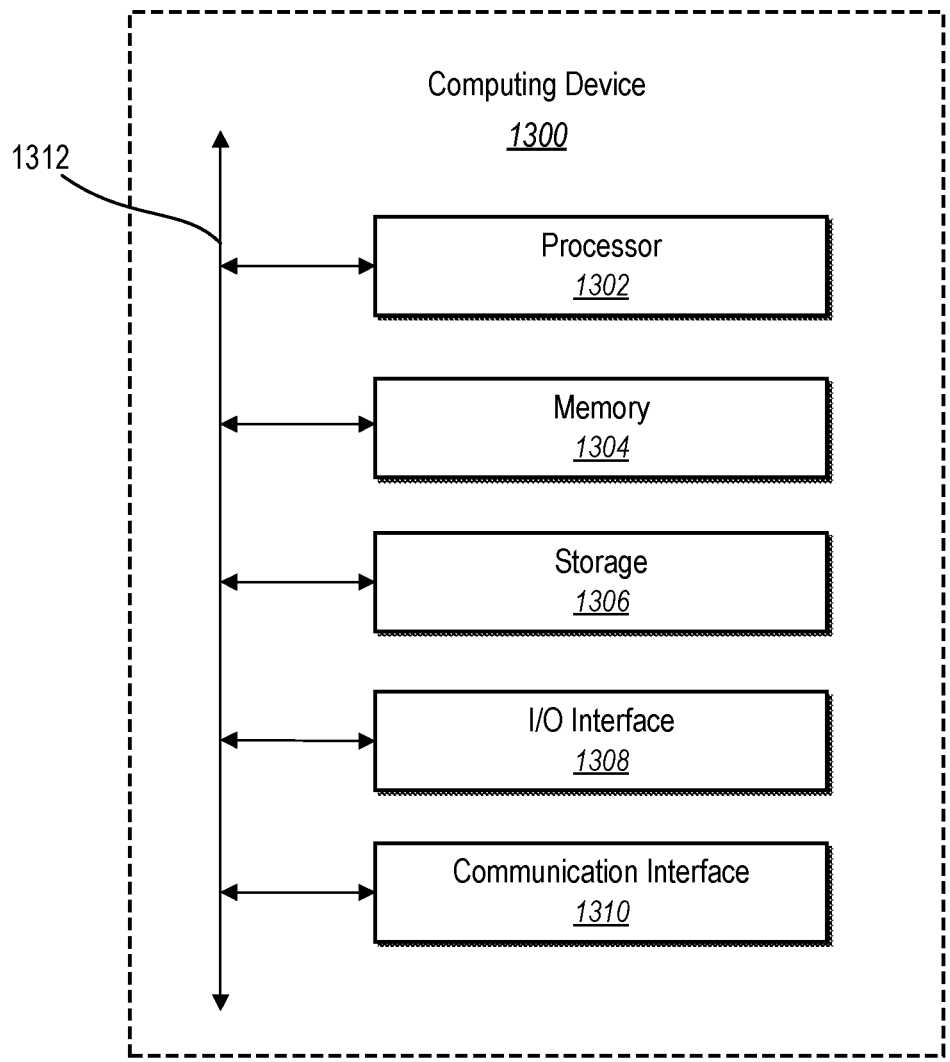
FIG. 13 illustrates a block diagram of an exemplary computing device in accordance with one or more embodiments.

FIG. 13 illustrates a block diagram of exemplary computing device 1300 (e.g., the server(s) 104 and/or the client devices 108a-108n) that may be configured to perform one or more of the processes described above. One will appreciate that server(s) 104 and/or the client devices 108a-108n may comprise one or more computing devices such as computing device 1300. As shown by FIG. 13, computing device 1300 can comprise processor 1302, memory 1304, storage device 1306, I/O interface 1308, and communication interface 1310, which may be communicatively coupled by way of communication infrastructure 1312. While an exemplary computing device 1300 is shown in FIG. 13, the components illustrated in FIG. 13 are not intended to be limiting. Additional or alternative components may be used in other implementations. Furthermore, in certain implementations, computing device 1300 can include fewer components than those shown in FIG. 13. Components of computing device 1300 shown in FIG. 13 will now be described in additional detail.

In particular implementations, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage device 1306 and decode and execute them. In particular implementations, processor 1302 may include one or more internal caches for data, instructions, or addresses. As an example and not by way of limitation, processor 1302 may include one or more instruction caches, one or more data caches, and one or more translation lookaside buffers (TLBs). Instructions in the instruction caches may be copies of instructions in memory 1304 or storage device 1306.

Memory 1304 may be used for storing data, metadata, and programs for execution by the processor(s). Memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1304 may be internal or distributed memory.

Storage device 1306 includes storage for storing data or instructions. As an example and not by way of limitation, storage device 1306 can comprise a non-transitory storage medium described above. Storage device 1306 may include a hard disk drive (HDD), a floppy disk drive, flash memory, an optical disc, a magneto-optical disc, magnetic tape, or a Universal Serial Bus (USB) drive or a combination of two or more of these. Storage device 1306 may include removable or non-removable (or fixed) media, where appropriate. Storage device 1306 may be internal or external to computing device 1300. In particular implementations, storage device 1306 is non-volatile, solid-state memory. In other implementations, Storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1308 allows a user to provide input to, receive output from, and otherwise transfer data to and receive data from computing device 1300. I/O interface 1308 may include a mouse, a keypad or a keyboard, a touch screen, a camera, an optical scanner, network interface, modem, other known I/O devices or a combination of such I/O interfaces. I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1308 is configured to provide graphical data to a display for presentation to a user. The graphical data may be representative of one or more graphical user interfaces and/or any other graphical content as may serve a particular implementation.

Communication interface 1310 can include hardware, software, or both. In any event, communication interface 1310 can provide one or more interfaces for communication (such as, for example, packet-based communication) between computing device 1300 and one or more other computing devices or networks. As an example and not by way of limitation, communication interface 1310 may include a network interface controller (NIC) or network adapter for communicating with an Ethernet or other wirebased network or a wireless NIC (WNIC) or wireless adapter for communicating with a wireless network, such as a WI-FI.

Additionally or alternatively, communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1310 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1310 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1312 may include hardware, software, or both that couples components of computing device 1300 to each other. As an example and not by way of limitation, communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 14:
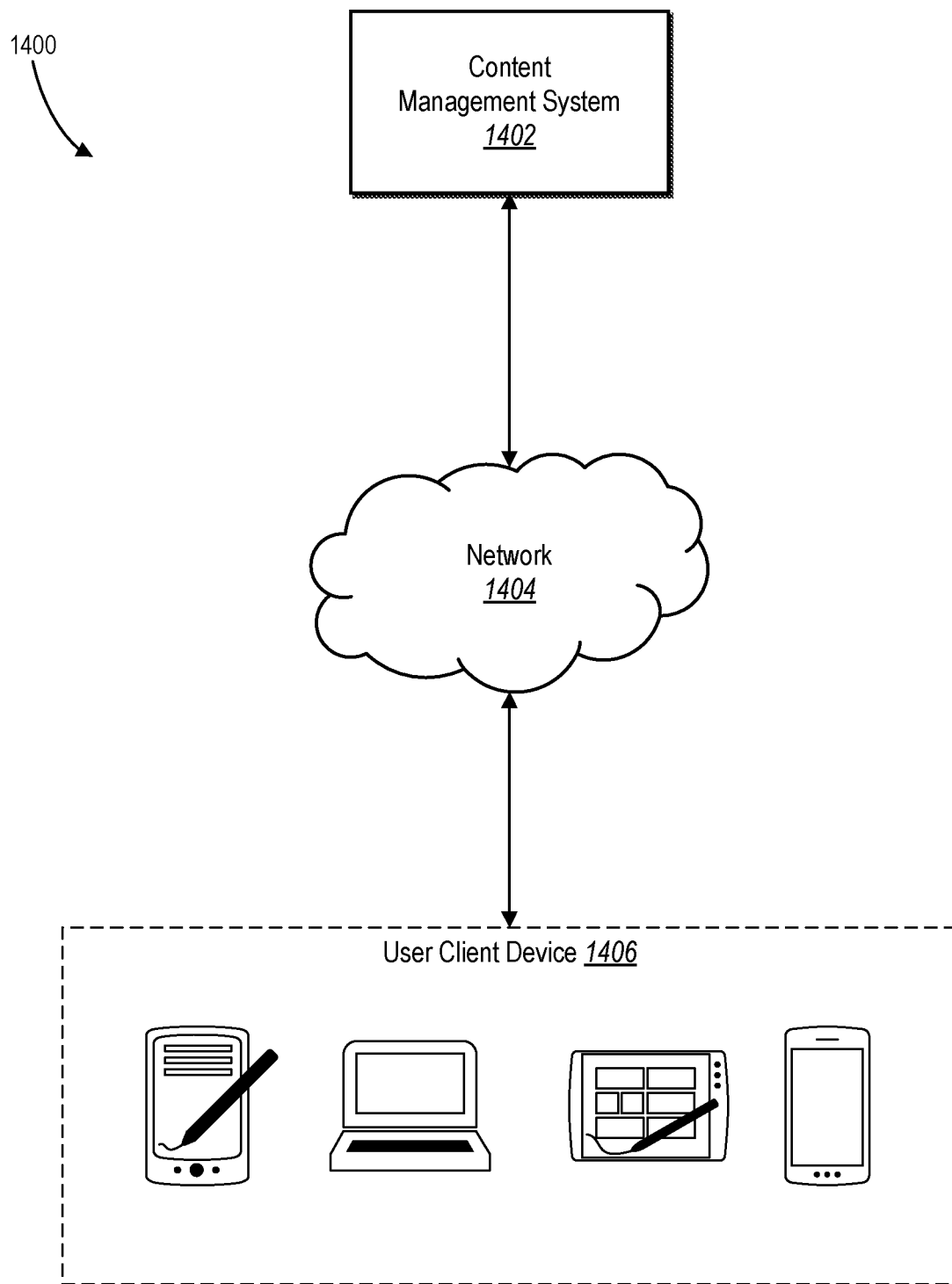
FIG. 14 illustrates an example environment of a networking system having the video transcript system in accordance with one or more embodiments.

FIG. 14 is a schematic diagram illustrating environment 1400 within which one or more implementations of the video transcript system 102 can be implemented. For example, the video transcript system 102 may be part of a content management system 1402 (e.g., the content management system 106). Content management system 1402 may generate, store, manage, receive, and send digital content (such as digital content items). For example, content management system 1402 may send and receive digital content to and from client devices 1406 by way of network 1404. In particular, content management system 1402 can store and manage a collection of digital content. Content management system 1402 can manage the sharing of digital content between computing devices associated with a plurality of users. For instance, content management system 1402 can facilitate a user sharing a digital content with another user of content management system 1402.

In particular, content management system 1402 can manage synchronizing digital content across multiple client devices 1406 associated with one or more users. For example, a user may edit digital content using client device 1406. The content management system 1402 can cause client device 1406 to send the edited digital content to content management system 1402. Content management system 1402 then synchronizes the edited digital content on one or more additional computing devices.

In addition to synchronizing digital content across multiple devices, one or more implementations of content management system 1402 can provide an efficient storage option for users that have large collections of digital content. For example, content management system 1402 can store a collection of digital content on content management system 1402, while the client device 1406 only stores reduced-sized versions of the digital content. A user can navigate and browse the reduced-sized versions (e.g., a thumbnail of a digital image) of the digital content on client device 1406. In particular, one way in which a user can experience digital content is to browse the reduced-sized versions of the digital content on client device 1406.

Another way in which a user can experience digital content is to select a reduced-size version of digital content to request the full- or high-resolution version of digital content from content management system 1402. In particular, upon a user selecting a reduced-sized version of digital content, client device 1406 sends a request to content management system 1402 requesting the digital content associated with the reduced-sized version of the digital content. Content management system 1402 can respond to the request by sending the digital content to client device 1406. Client device 1406, upon receiving the digital content, can then present the digital content to the user. In this way, a user can have access to large collections of digital content while minimizing the amount of resources used on client device 1406.

Client device 1406 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1406 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1404.

Network 1404 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1406 may access content management system 1402.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   receiving, from a client device, an indication of a user interaction selecting a portion of a video transcript associated with a digital video;
   in response to the user interaction selecting the portion of the video transcript, determining a video portion of the digital video corresponding to the portion of the video transcript; and
   based on an additional user interaction sharing the portion of the video transcript selected by the user interaction:
      determining one or more transcript locations comprising the portion of the video transcript selected by the user interaction;
      generating a video segment comprising the video portion corresponding to the one or more transcript locations; and
      providing the video segment to an additional client device associated with the additional user interaction sharing the portion of the video transcript.

2. The method of claim 1, further comprising:
   receiving, from the client device, an indication of a selection of text from the video transcript; and
   based on the selection of text, providing a visual indication of a selected video portion corresponding to the text selected within the video transcript.

3. The method of claim 1, further comprising:
   receiving a deletion of text from a transcript location within the video transcript; and
   generating a modified digital video by:
      removing a first video portion of the digital video based on the deletion of text from the transcript location; and
      based on removing the first video portion, generating a transition to stitch together a previous portion of the digital video before the first video portion and a subsequent portion of the digital video after the first video portion.

4. The method of claim 1, further comprising:
   receiving, from the client device, a text addition to a transcript location within the video transcript associated with the digital video;
   determining a second video portion corresponding to the transcript location within the video transcript; and
   generating a video element to add to the second video portion based on the text addition to the transcript location.

5. The method of claim 1, further comprising:
   receiving, from the client device, a comment on a portion of the video transcript associated with the digital video; and
   based on the comment on the portion of the video transcript, generating a video comment for display within the digital video on the client device.

6. The method of claim 1, wherein providing the video segment to the additional client device is based on sharing the portion of the video transcript.

7. The method of claim 1, further comprising maintaining a version history for the digital video by storing versions of the digital video corresponding to modifications made in response to user interactions with the video transcript.

8. A system comprising:
   at least one processor; and
   a non-transitory computer readable medium comprising instructions that, when executed by the at least one processor, cause the system to:
      receive, from a client device, an indication of a user interaction selecting a portion of a video transcript associated with a digital video;
      in response to the user interaction selecting the portion of the video transcript, determine a video portion of the digital video corresponding to the portion of the video transcript; and
      based on an additional user interaction sharing the portion of the video transcript selected by the user interaction:
         determine one or more transcript locations comprising the portion of the video transcript selected by the user interaction;
         generate a video segment comprising the video portion corresponding to the one or more transcript locations; and
         provide the video segment to an additional client device associated with the additional user interaction sharing the portion of the video transcript.

9. The system of claim 8, further comprising instructions that, when executed by the at least one processor, cause the system to:
   receive, from the client device, an indication of a selection of text from the video transcript; and
   based on the selection of text, provide a visual indication of a selected video portion corresponding to the text selected within the video transcript.

10. The system of claim 8, further comprising instructions that, when executed by the at least one processor, cause the system to:

receive a deletion of text from a transcript location within the video transcript; and generate a modified digital video by:

removing a first video portion of the digital video based on the deletion of text from the transcript location; and based on removing the first video portion, generating a transition to stitch together a previous portion of the digital video before the first video portion and a subsequent portion of the digital video after the first video portion.

11. The system of claim 8, further comprising instructions that, when executed by the at least one processor, cause the system to:

receive, from the client device, a text addition to a transcript location within the video transcript associated with the digital video;

determine a second video portion corresponding to the transcript location within the video transcript; and generate a video element to add to the second video portion based on the text addition to the transcript location.

12. The system of claim 8, further comprising instructions that, when executed by the at least one processor, cause the system to:

receive, from the client device, a comment on a portion of the video transcript associated with the digital video; and based on the comment on the portion of the video transcript, generate a video comment for display within the digital video on the client device.

13. The system of claim 8, further comprising instructions that, when executed by the at least one processor, cause the system to provide the video segment to the additional client device based on sharing the portion of the video transcript.

14. The system of claim 8, further comprising instructions that, when executed by the at least one processor, cause the system to maintain a version history for the digital video by storing versions of the digital video corresponding to modifications made in response to user interactions with the video transcript.

15. A non-transitory computer readable medium comprising instructions that, when executed by at least one processor, cause the at least one processor to:

receive, from a client device, an indication of a user interaction selecting a portion of a video transcript associated with a digital video;

in response to the user interaction selecting the portion of the video transcript, determine a video portion of the digital video corresponding to the portion of the video transcript; and based on an additional user interaction sharing the portion of the video transcript selected by the user interaction:

determine one or more transcript locations comprising the portion of the video transcript selected by the user interaction;

generate a video segment comprising the video portion corresponding to the one or more transcript locations; and provide the video segment to an additional client device associated with the additional user interaction sharing the portion of the video transcript.

16. The non-transitory computer readable medium of claim 15, further comprising instructions that, when executed by the at least one processor, cause the at least one processor to:

receive, from the client device, an indication of a selection of text from the video transcript; and based on the selection of text, provide a visual indication of a selected video portion corresponding to the text selected within the video transcript.

17. The non-transitory computer readable medium of claim 15, further comprising instructions that, when executed by the at least one processor, cause the at least one processor to:

receive a deletion of text from a transcript location within the video transcript; and generate a modified digital video by:

removing a corresponding video portion of the digital video based on the deletion of text from the transcript location; and based on removing the video portion, generating a transition to stitch together a previous portion of the digital video before video portion and a subsequent portion of the digital video after the video portion.

18. The non-transitory computer readable medium of claim 15, further comprising instructions that, when executed by the at least one processor, cause the at least one processor to:

receive, from the client device, a text addition to a transcript location within the video transcript associated with the digital video;

determine an additional video portion corresponding to the transcript location within the video transcript; and generate a video element to add to the additional video portion based on the text addition to the transcript location.

19. The non-transitory computer readable medium of claim 15, further comprising instructions that, when executed by the at least one processor, cause the at least one processor to:

receive, from the client device, a comment on a portion of the video transcript associated with the digital video; and based on the comment on the portion of the video transcript, generate a video comment for display within the digital video on the client device.

20. The non-transitory computer readable medium of claim 15, further comprising instructions that, when executed by the at least one processor, cause the at least one processor to provide the video segment to the additional client device based on sharing the portion of the video transcript.

* * * * *